United States Patent [19]

Takahashi

[11] Patent Number: 5,561,493
[45] Date of Patent: Oct. 1, 1996

[54] METHOD OF CONTROLLING AN OPERATION OF AN ELECTRONICALLY CONTROLLED CAMERA

[75] Inventor: Hiroyuki Takahashi, Tokyo, Japan

[73] Assignee: Asahi Kogaku Kogyo Kabushiki Kaisha, Tokyo, Japan

[21] Appl. No.: 258,454

[22] Filed: Jun. 10, 1994

[30] Foreign Application Priority Data

Jun. 11, 1993 [JP] Japan .................................. 5-166208
Jun. 11, 1993 [JP] Japan .................................. 5-166209

[51] Int. Cl.$^6$ ................................................ G03B 17/00
[52] U.S. Cl. ................................ 396/48; 396/439
[58] Field of Search ............................................ 354/412

[56] References Cited

U.S. PATENT DOCUMENTS

| | | |
|---|---|---|
| 5,274,416 | 12/1993 | Kawasaki et al. ................. 354/412 |
| 5,300,978 | 4/1994 | Miyasaka . |
| 5,305,044 | 4/1994 | Suzuki et al. ..................... 354/400 |
| 5,315,345 | 5/1994 | Kawasaki et al. ................. 354/484 |
| 5,331,367 | 7/1994 | Kawasaki et al. ................. 354/412 |

*Primary Examiner*—W. B. Perkey
*Attorney, Agent, or Firm*—Greenblum & Bernstein P.L.C.

[57] ABSTRACT

A method of controlling an electronically controlled camera. A system of the camera has a memory for storing a program to control the camera, including at least one auxiliary process, a rewritable memory for storing a flag data used for determining whether the at least one auxiliary process is to be executed, and operational data for executing the at least one auxiliary process. The method includes steps of reading the flag data, determining whether the at least one auxiliary process is to be executed based on the flag data, and executing the at least one auxiliary process based upon the operational data only when it is determined that the at least one auxiliary data is to be executed.

21 Claims, 21 Drawing Sheets

OR/AND/EOR
  00h: OR
  01h: AND
  02h: EOR

FIG. 11

| POINT8 | POINT7 | POINT6 | POINT5 | POINT4 | POINT3 | POINT2 | POINT1 |
|---|---|---|---|---|---|---|---|

FIG. 12

| F_POINT8 | F_POINT7 | F_POINT6 | F_POINT5 | F_POINT4 | F_POINT3 | F_POINT2 | F_POINT1 |
|---|---|---|---|---|---|---|---|

FIG. 13

| I/O AREA | I/O AREA | I/O AREA | I/O AREA | AREA FOR DATA READ FROM EEPROM | AREA FOR DATA READ FROM EEPROM | GENERAL RAM AREA | GENERAL RAM AREA |
|---|---|---|---|---|---|---|---|
| 00 - 0F | 10 - 1F | 20 - 2F | 30 - 3F | 40 - 4F | 50 - 5F | 60 - 6F | 70 - 7F |
| P00~P07 OUTPUT DATA | | | | EACH POINT EXECUTION OK FLAG | | | |
| P00~P07 DIRECTIONAL DATA | | | | | | | |
| P10~P17 OUTPUT DATA | | | | | | | |
| P10~P17 DIRECTIONAL DATA | | | | | | | |
| 80 - 8F | 90 - 9F | A0 - AF | B0 - BF | C0 - CF | D0 - DF | E0 - EF | F0 - FF |
| | | | | | | | STACK BOTTOM (HIGHEST LOCATION) |
| GENERAL RAM AREA | GENERAL RAM AREA | STACK AREA | STACK AREA | STACK AREA | STACK AREA | STACK AREA | STACK AREA |

METHOD OF CONTROLLING AN OPERATION OF AN ELECTRONICALLY CONTROLLED CAMERA

BACKGROUND OF THE INVENTION

The present invention relates to a method of controlling an operation of an electronically controlled camera.

Electronically controlled cameras have a central processing unit (CPU) installed as a control unit for controlling the operation of the camera according to a program which is usually stored in a read-only memory (ROM).

Since the program is stored in the ROM, if the program contains a bug, then, even though only a small portion of the program needs to be modified, the entire program must be changed by replacing the ROM. Further, the addition of a new function to the existing program for use in a special application also requires that the entire program be changed by replacing the ROM. The exchanging of the ROM is a tedious and time-consuming process. Consequently, there has been a demand for simplifying the process by which a camera program can be modified.

SUMMARY OF THE INVENTION

It is therefore an object of the present invention to provide an improved method of controlling an electronically controlled camera which enables execution of an auxiliary process without replacing the ROM.

According to the present invention, there is provided a method of controlling an operation of an electronically controlled camera. A system of the electronically controlled camera includes a memory for storing a program to control the camera where the program includes at least one auxiliary process, a rewritable memory for storing flag data used for determining whether the at least one auxiliary process is to be executed, and operational data used for executing the at least one auxiliary process.

The method of controlling the operation of the electronically controlled camera according to the present invention comprises the steps of reading the flag data, determining whether the at least one auxiliary process is to be executed based on the flag data, and executing the at least one auxiliary process based upon the operational data only when it is determined that the at least one auxiliary process is to be executed.

Optionally, the operational data includes information related to a bit manipulation of data stored in another memory for temporarily storing parameter data for the camera.

Alternatively, the operational data includes address data which designates a supplemental program stored in the rewritable memory, and wherein a predetermined operation is performed by executing the supplemental program.

The auxiliary process is executed in order to cancel a bug contained in the program for controlling the camera.

DESCRIPTION OF THE ACCOMPANYING DRAWINGS

FIG. 11 is a diagram showing specific bit information with respect to POINT execution OK information shown in FIG. 8;

FIG. 12 is a diagram showing POINT execution OK flags set based on the POINT execution OK information shown in FIG. 11;

FIG. 13 is a map diagram showing memory areas in a random-access memory (RAM) in the control system shown in FIG. 4;

DESCRIPTION OF THE EMBODIMENT

Figure 1:
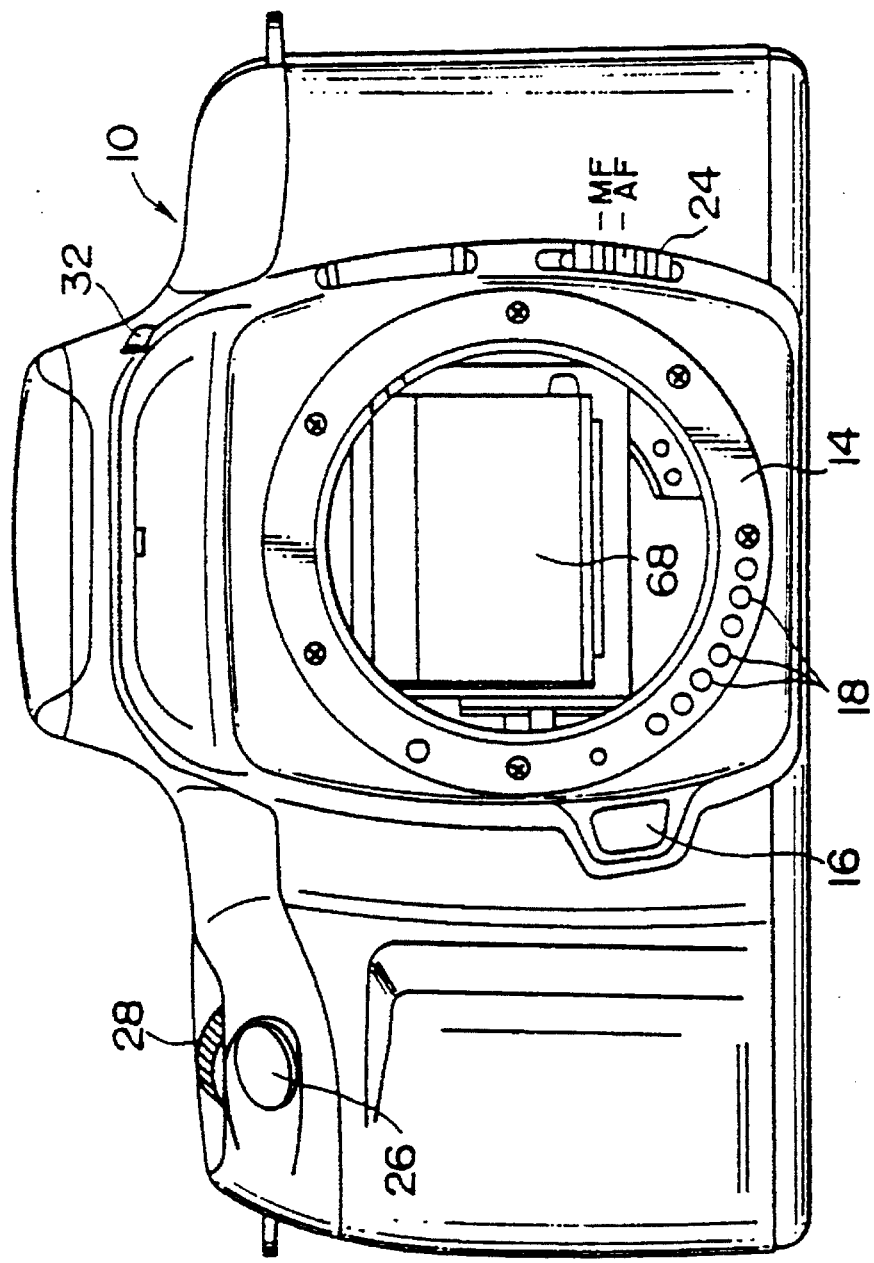
FIG. 1 is a front elevational view of an electronically controlled camera according to the present invention.
Figure 2:
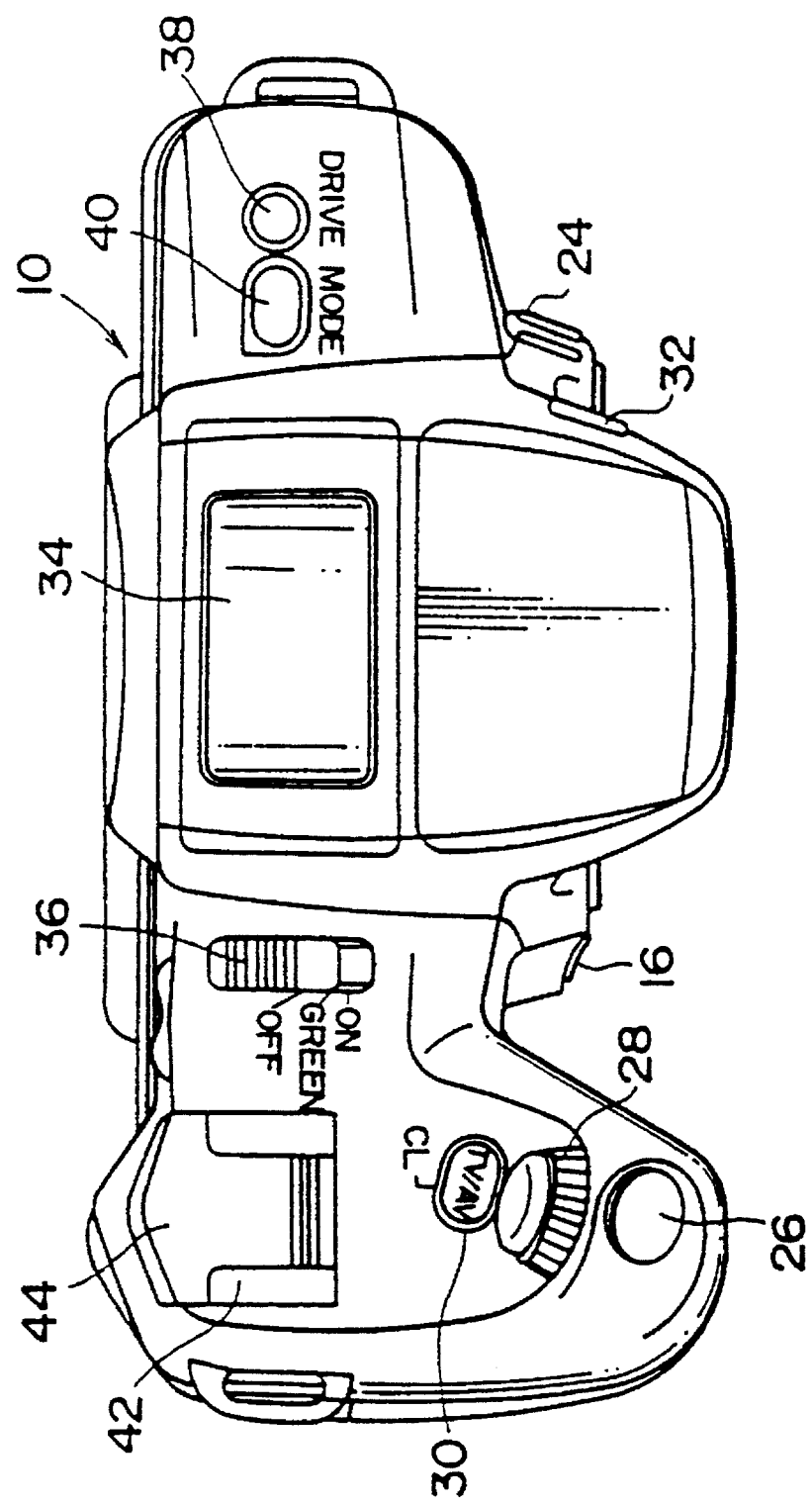
FIG. 2 is a plan view of the electronically controlled camera shown in FIG. 1.
Figure 3:
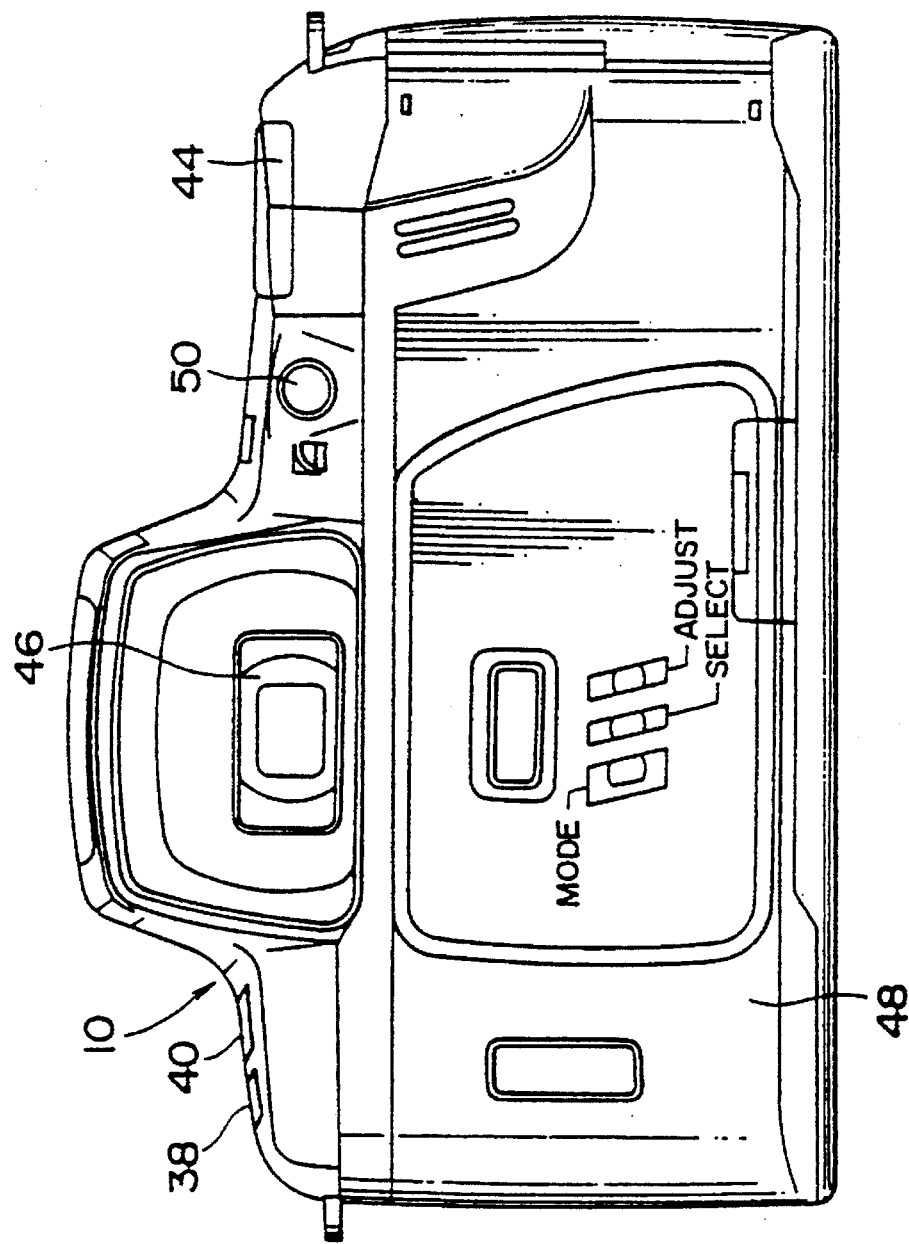
FIG. 3 is a rear elevational view of the electronically controlled camera shown in FIG. 1.

FIGS. 1 through 3 show a single-lens reflex camera as an embodiment of the present invention. The single-lens reflex camera has a camera body 10 including a lens mount 14 on which a lens assembly 12 (see FIG. 4) is replaceably or detachably mounted. The lens assembly 12 includes a power zoom lens assembly which can be actuated by a built-in zoom motor (not shown) to change its focal length between 28 mm and 80 mm, for example.

Figure 4:
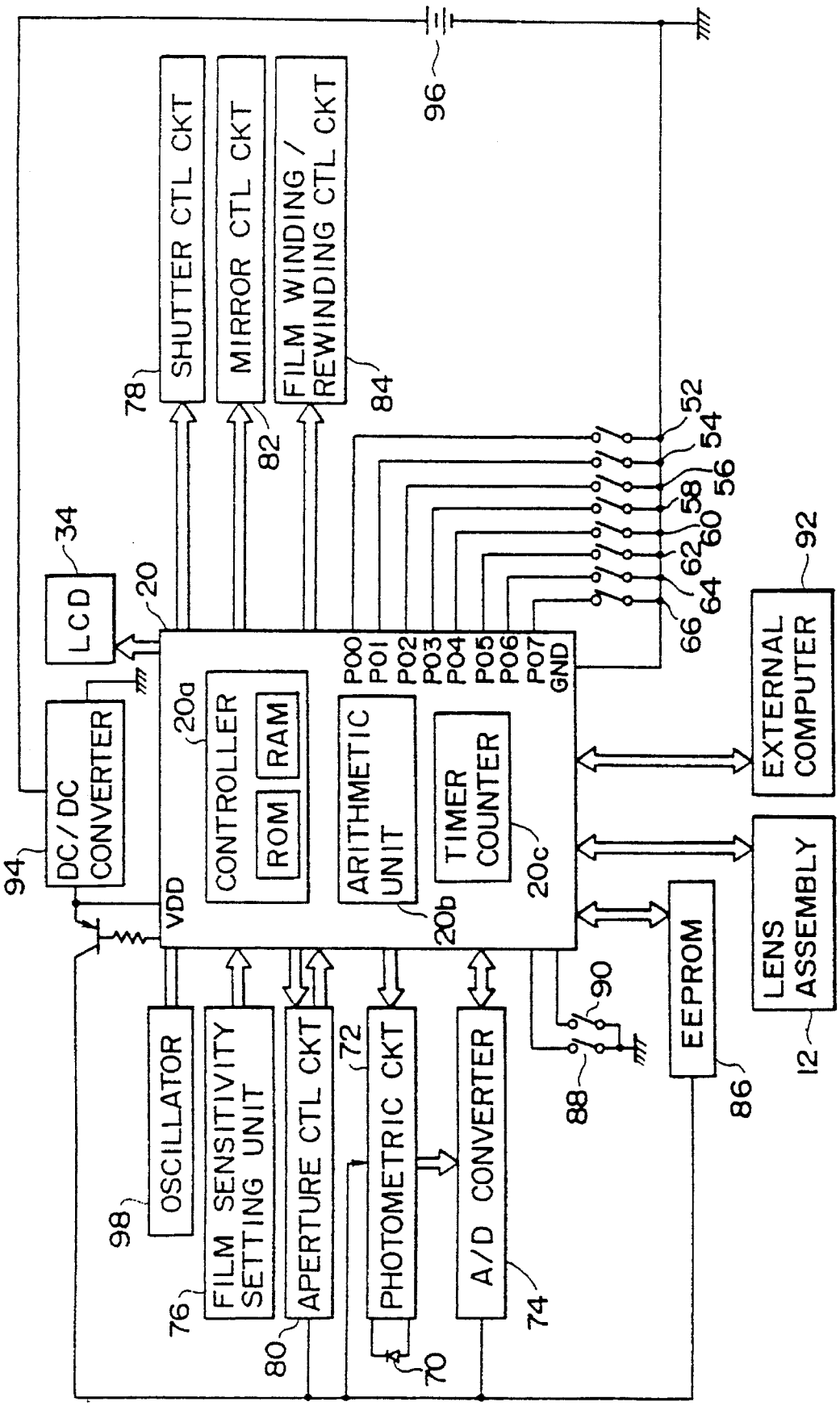
FIG. 4 is a block diagram of a control system of the electronically controlled camera shown in FIG. 1.

When mounted on the camera body 10, the lens assembly 12 is locked on to the lens mount 14. When a lens lock button 16 disposed on the camera body 10 on the left-hand side, of the lens mount 14 is pressed, as viewed in FIG. 1, the lens assembly 12 can be unlocked from the lens mount 14 for removal from the lens mount 14. With the lens assembly 12 mounted on the camera body 10, connection terminals 18 on a front surface of the lens mount 14 are held in electric contact with connection terminals (not shown) on a rear surface of the lens assembly 12, thereby establishing a connection for communication between a body CPU 20 in the camera body 10 and a lens CPU (not shown) in the lens assembly 12, as shown in FIG. 4.

A focus mode selector button 24 is disposed on the camera body 10 in a substantially vertically slidable manner on the right-hand side of the lens mount 14 as viewed in FIG. 1, for selecting either a manual focusing (MF) mode to manually focus the lens assembly 12, or an automatic focusing (AF) mode to automatically focus the lens assembly 12. The AF mode is selected when the focus mode selector button 24 is shifted to bring a mark "-" (see FIG. 1) thereon into alignment with a mark "AF" on the camera body 10, and the MF mode is selected when the focus mode selector button 24 is shifted to bring the mark "-" into alignment with a mark "MF" on the camera body 10.

As shown in FIGS. 1 and 2, a shutter release button 26 is depressably disposed on a foremost portion of the left-hand area of the upper surface of the camera body 10. A rocker switch 28, for increasing/reducing indicated data, is disposed on the upper surface of the camera body 10 immediately behind the shutter release button 26 for rotation about an axis substantially parallel to the optical axis of the lens assembly 12, i.e., an axis extending substantially along the transverse direction of the camera body 10. A Tv/Av button 30, which also functions as a clear button, is depressably disposed on the upper surface of the camera body 10 immediately behind the rocker switch 28. In an automatic exposure mode (A) or a manual exposure mode (M) which is selected when a main button 36 (described later on) is shifted to an ON position, a shutter speed priority mode or an aperture priority mode is alternately selected each time the Tv/Av button 30 is pressed.

A built-in flash unit (not shown) is housed in a front portion of the camera body 10 near its central area. The built-in flash unit can be popped up when a pop-up button 32 is pressed. As shown in FIG. 2, a liquid crystal display (LCD) panel 34, which displays various items of information required to photograph subjects, is externally visibly mounted on a rear portion of the camera body 10 near its central area. The main button 36 is disposed on the upper surface of the camera body 10 on the left-hand side, as viewed in FIG. 2, of the LCD panel 34 for sliding movement in a transverse direction of the camera body 10. Specifically, the main button 36 is slidable between an OFF position, a GREEN position, and an ON position. When the main button 36 is in the OFF position, a main switch (described later on) is turned OFF, and when the main button 36 is in the GREEN position or the ON position, the main switch is turned on.

When the main button 36 is in the ON position, there is established an exposure mode (full specification mode: FULL) in which a program mode (P), an automatic exposure mode (A), a manual exposure mode (M), or a bulb process mode (B) can be selected. When the rocker switch 28 is turned with a mode button 40 (described later on) pressed, the program mode (P), the automatic exposure mode (A), the manual exposure mode (M), and the bulb process mode (B) can be successively changed or selected. When the main button 36 is in the GREEN position, there is established a photographing mode suitable for a novice to take pictures.

With the manual exposure mode (M) selected, either a shutter speed or an aperture, as selected by the Tv/Av button 30, can be varied by turning the rocker switch 28.

A drive button 38 for selecting a drive mode is depressably disposed on the right-hand area, as viewed in FIG. 2, of the upper surface of camera body 10. A mode button 40 for selecting an exposure mode is also depressably disposed on the right-hand area of the upper surface of camera body 10 on the left-hand side of the drive button 38. The drive button 38 and the mode button 40 can independently or simultaneously be pressed by the forefinger of the left hand of the user which grips the left-hand side, as viewed in FIGS. 1 and 2, of the camera body 10.

When the rocker switch 28 is turned with the drive button 38 pressed, the drive mode switches successively between a single-picture photographing mode, a successive-picture photographing mode, and a self-timer photographing mode. When the rocker switch 28 is turned with the mode button 40 pressed, the exposure mode switches successively between the program mode (P), the automatic exposure mode (A), the manual exposure mode (M), and the bulb process mode (B).

An accessory shoe 42 for mounting an external flash unit (not shown) is disposed on the left-hand area, as viewed in FIG. 2, of the upper surface of the camera body 10. The accessory shoe 42 is normally covered with a cover 44.

As shown in FIG. 3, a viewfinder eyepiece 46 is mounted on an upper portion of the rear panel of the camera body 10. The rear panel of the camera body 10 has a lower portion which is openably covered substantially in its entirety with a rear lid 48 that can be opened to insert or remove a film cartridge. The rear lid 48 is equipped with a device (not shown) for recording the day, month, and year of pictures taken on the film loaded in the camera body 10.

An exposure correction button 50 is depressably mounted on an upper right-hand portion, as viewed in FIG. 3, of the rear panel of the camera body 10. Provided that the program mode (P) or the automatic exposure mode (A) is selected, when the rocker switch 28 is turned with the exposure correction button 50 pressed, optimum exposure conditions calculated by the camera are changed in either a positive or negative direction based on the intention of the user.

The camera body 10 houses a switch assembly (not shown) disposed below the shutter release button 26. The switch assembly has a photometric switch 52 (see FIG. 4) which is operatively coupled to the shutter release button 26 and can be turned ON when the shutter release button 26 is partly pressed, and a shutter release switch 54 (see FIG. 4) which is operatively coupled to the shutter release button 26 and can be turned ON when the shutter release button 26 is fully pressed. The camera body 10 also houses a Tv/Av selector switch 56 disposed below the Tv/Av button 30 and operatively coupled therewith. The Tv/Av selector switch 56 can select the shutter speed prior mode or the aperture priority mode when the Tv/Av button 30 is pressed.

The rocker switch 28 is angularly movable, but not depressable. The rocker switch 28 has a lever member (not shown) operatively coupled to an UP switch 58 and a DOWN switch 60 as shown in FIG. 4. When the lever member is turned counterclockwise in FIG. 1, the UP switch 58 is turned on. When the lever member is turned clockwise in FIG. 1, the DOWN switch 60 is turned on. The lever member is normally urged by a return spring (not shown) to be resiliently returned to and held in a neutral position in which both the UP switch 58 and the DOWN switch 60 are not turned on.

The camera body 10 also houses a mode switch 62 disposed below the mode button 40 and operatively coupled thereto. The mode switch 62 can be turned on when the mode button 40 is pressed. The camera body 10 also houses a drive switch 64 disposed below the drive button 38 and operatively coupled thereto. The drive switch 64 can be turned on when the drive button 38 is pressed. The camera body 10 further houses a main switch 66 disposed below and operatively coupled to the main button 36. The main switch 66 can be turned on when the main button 36 is shifted.

The camera has a control system as shown in FIG. 4.

The control system includes the body CPU 20 to which a segmented photometric sensor 70 is connected through a photometric circuit 72 and an analog-to-digital (A/D) converter 74. The photometric sensor 70 produces an electric signal depending on the intensity of light falling thereon. The electric signal is logarithmically compressed by the photometric circuit 72, and then converted by the A/D converter 74 to a digital signal, which is supplied as a photometric signal to the body CPU 20. The body CPU 20 processes the digital photometric signal from the A/D converter 74 and film sensitivity information from a film sensitivity setting unit 76 thereby calculating an optimum shutter speed and aperture values for exposure. Based on the calculated shutter speed and aperture values, the body CPU 20 controls a shutter control circuit 78 and an aperture control circuit 80 to actuate a focal plane shutter unit (not shown) and a diaphragm mechanism (not shown) in the camera body 10.

As described above, the body CPU 20 performs predetermined exposure calculations based on the digital photometric signal and the film sensitivity information in order to determine an optimum shutter speed and aperture values for exposure; the body CPU 20 further controls the shutter control circuit 78 and the aperture control circuit 80 based on the determined optimum shutter speed and aperture values for exposing the film loaded in the camera body 10. In addition, the body CPU 20 controls a mirror control circuit 82 to energize a mirror motor (not shown) to lift and lower a main mirror 68 (see FIG. 1), thus exposing one frame of the loaded film. After one frame of the film has been exposed, the body CPU 20 controls a film winding/rewinding control circuit 84 to energize a winding motor (not shown) to wind the film. After a predetermined number of frames of the film have been exposed, the body CPU 20 controls the film winding/rewinding control circuit 84 to energize a rewinding motor (not shown) to rewind the film.

The body CPU 20 also sends data and commands to, and receives data and commands from, the lens CPU through the connection terminals 18 on the lens mount 14 and the connection terminals on the lens assembly 12. The lens assembly 12 has a focal length detecting mechanism (not shown) connected to the lens CPU, for detecting a presently set focal length.

The body CPU 20 includes a controller 20a for controlling an overall operation thereof. The controller 20a including a ROM for storing programs and a RAM for storing data and programs. The body CPU 20 also includes an arithmetic unit 20b for effecting various arithmetic operations, such as, for example, automatic focusing (AF) calculations, power zoom (PZ) calculations, automatic exposure (AE) calculations, etc., and a timer counter 20c. To the controller 20a, there is connected an EEPROM 86 as an external memory which comprises an electrically erasable nonvolatile memory. The EEPROM 86 stores various constants inherent in the camera body 10, various functions and constants needed for the automatic focusing (AF) calculations, power zoom (PZ) calculations, automatic exposure (AE) calculations, etc., POINT execution OK bit information, POINT information, and programs executed in POINT processes. These items of information will be described in detail later on.

The body CPU 20 has light ports P00-P07 which are connected, respectively, to the photometric switch 52 that can be turned ON when the shutter release button 26 is partly pressed, the shutter release switch 54 that can be turned ON when the shutter release button 26 is fully pressed, the Tv/Av selector switch 56, the UP switch 58, the DOWN switch 60, the mode switch 62, the drive switch 64, and the main switch 66.

To the body CPU 20, there are also connected a mirror lifting switch 88 for forcibly lifting the main mirror 68 and a mirror lowering switch 90 for forcibly lowering the main mirror 68.

An external computer 92 such as, for example, a personal computer is connected to the body CPU 20 through a communication controller (not shown), for rewriting data in the EEPROM 86, modifying programs, and/or performing testing operation.

The body CPU 20 has a power supply terminal VDD connected to the positive terminal of a power supply 96 through a DC/DC converter 94. The power supply 96 has its negative terminal connected to a ground terminal GND of the body CPU 20. An oscillator 98 is connected to the body CPU 20 for generating and supplying a clock signal to the body CPU 20.

Figure 5:
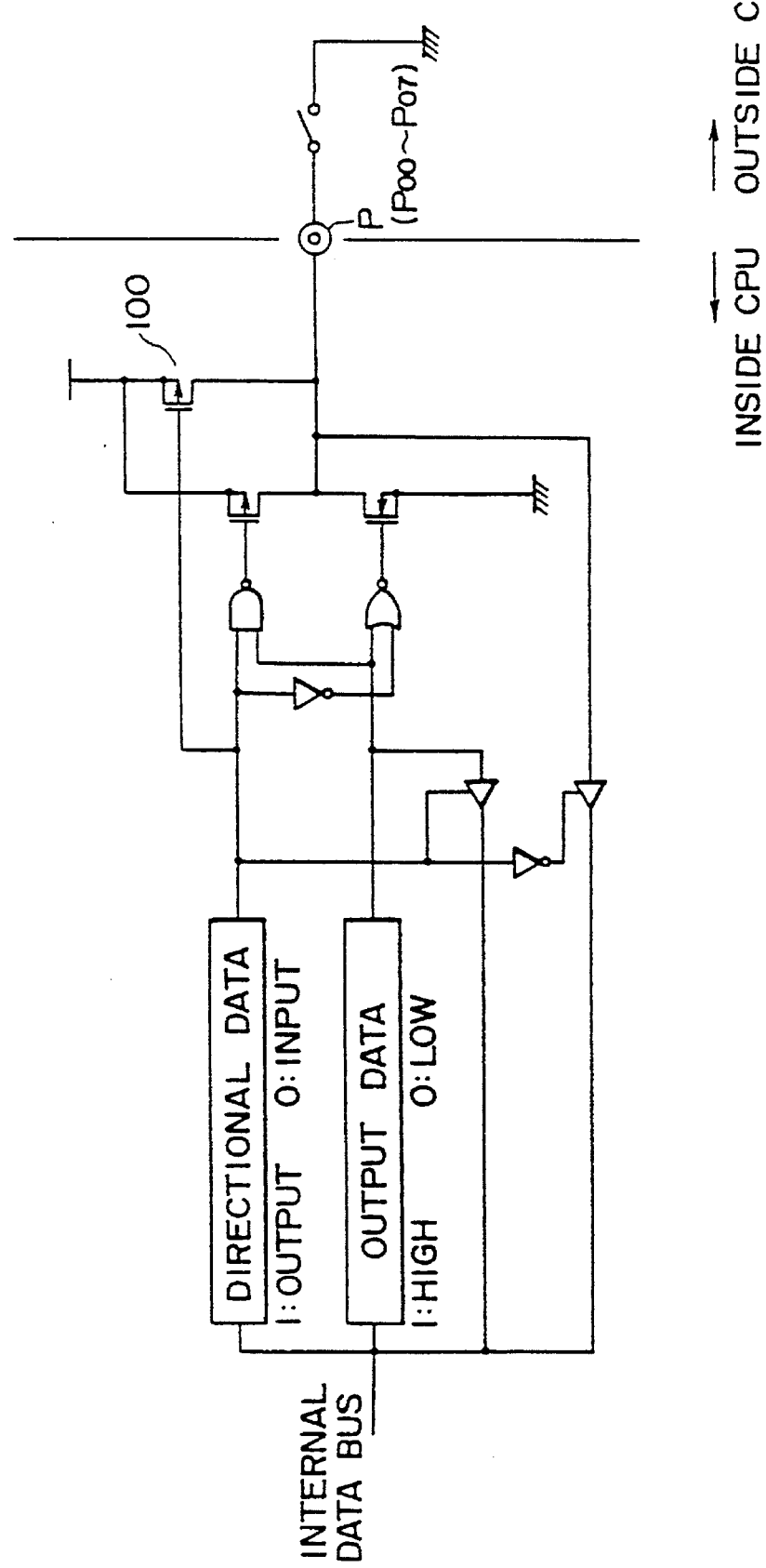
FIG. 5 is a circuit diagram of an electric circuit arrangement associated with ports P00~P07 of the control system shown in FIG. 4.

A circuit arrangement associated with the light ports P00-P07 will be described below with reference to FIG. 5. Since the light ports P00-P07 are identical to each other, they are represented by "P" in FIG. 5.

Each port P serves as an input/output port, i.e., as either an input port or an output port selected based on directional data (described below). Each port P is "pulled up" by a metal-oxide-semiconductor field-effect transistor (MOSFET) 100 which functions as a pull-up resistor. When directional data are set to "0" in FIG. 5, the port P functions as an input port for transmitting the state of an external switch connected to the port to an internal data bus. When the port P functions as an input port, the MOSFET 100 is turned ON, and consumes a certain amount of electric energy if the external switch is turned ON, i.e., grounded. When directional data are set to "1" in FIG. 5, the port P functions as an output port for outputting data from the internal data bus. When the port P functions as an output port, the MOSFET 100 is turned OFF, and does not consume any electric energy if a "0" signal is outputted as the output data, irrespective of whether the external switch is turned ON or OFF.

A control sequence carried out by the body CPU 20 for controlling the electronically controlled camera will be described below with reference to the accompanying flowcharts.

The control sequence includes a main routine composed of a POFF loop corresponding to a standby state and a PON loop corresponding to an operating state. Various processes for controlling the electronically controlled camera according to the present invention are executed from the PON loop. As one of such controlling processes, a shutter release process for controlling the camera to take a picture upon full depression of the shutter release button 26 will be described below.

According to the present invention, eight POINT processes, i.e., POINT 1 through POINT 8 processes as auxiliary processes, are included at various locations in the control sequence described below. In each of the POINT processes, which will be described in specific detail later, a given program is written in the EEPROM 86 without modifying or changing an existing program in any way, and such a written program is executed selectively in a certain POINT for canceling, or virtually eliminating a bug found in the main program, or adding a special function to the main program for a special application.

MAIN ROUTINE

Figure 6:
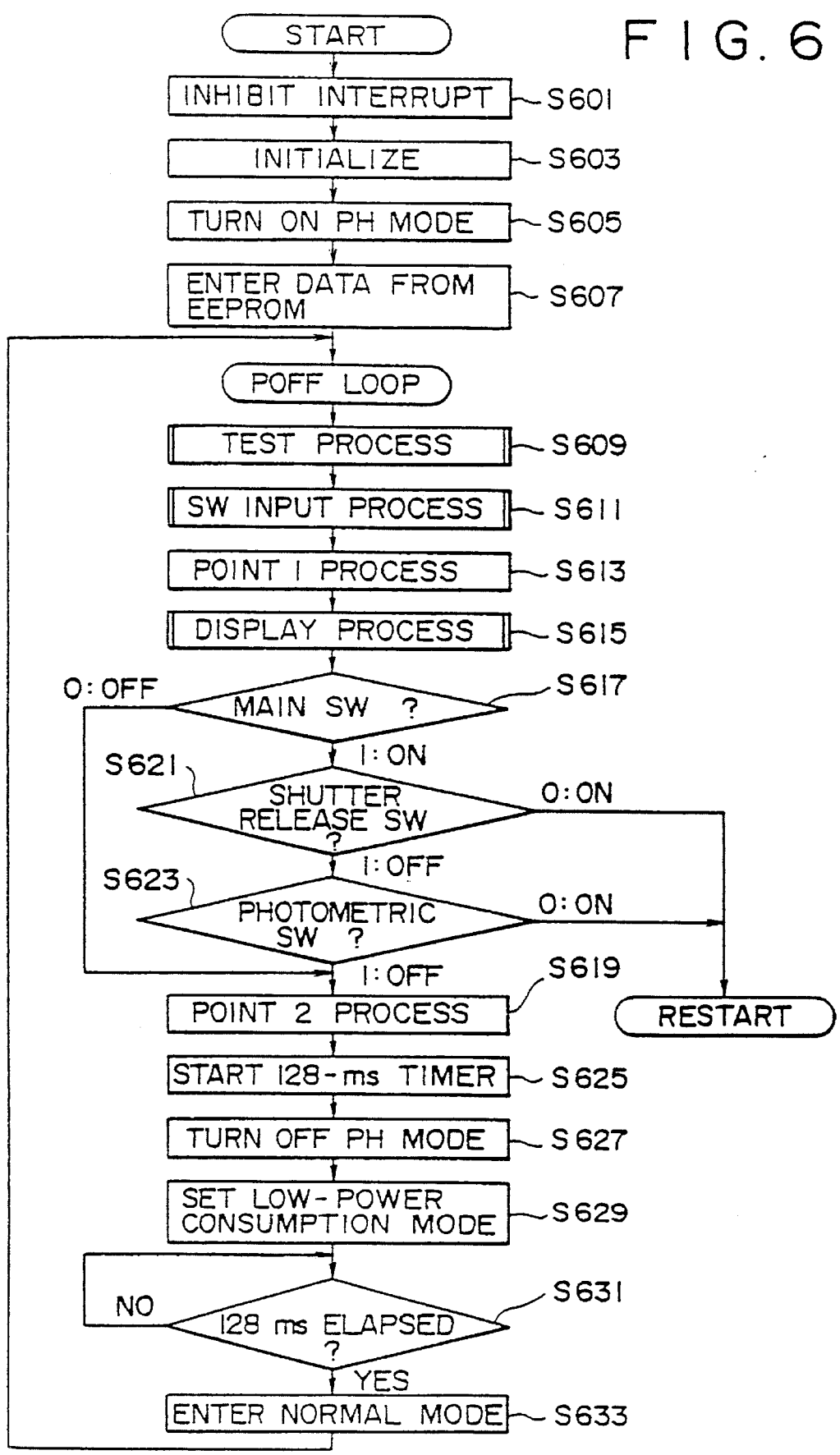
FIG. 6 is a flowchart of a main routine of a control sequence carried out by a body CPU in the control system shown in FIG. 4.

FIG. 6 is a flowchart of the main routine of the control sequence carried out by the body CPU 20 in the control system shown in FIG. 4.

The main routine starts being executed when a battery is inserted in the camera. When a battery is inserted in the camera, any interrupt is inhibited in step S601, and then flags are initialized, the RAM and registers are initialized, a stack pointer is set to a highest location, and the ports are initialized, i.e., output data from ports P00–P07 are set to "0", in step S603. Then, a power-hold mode is turned ON to energize the entire electric hardware of the camera in step S605, and data stored in the EEPROM 86 are written in the RAM in the body CPU 20 in step S607.

Figure 7:
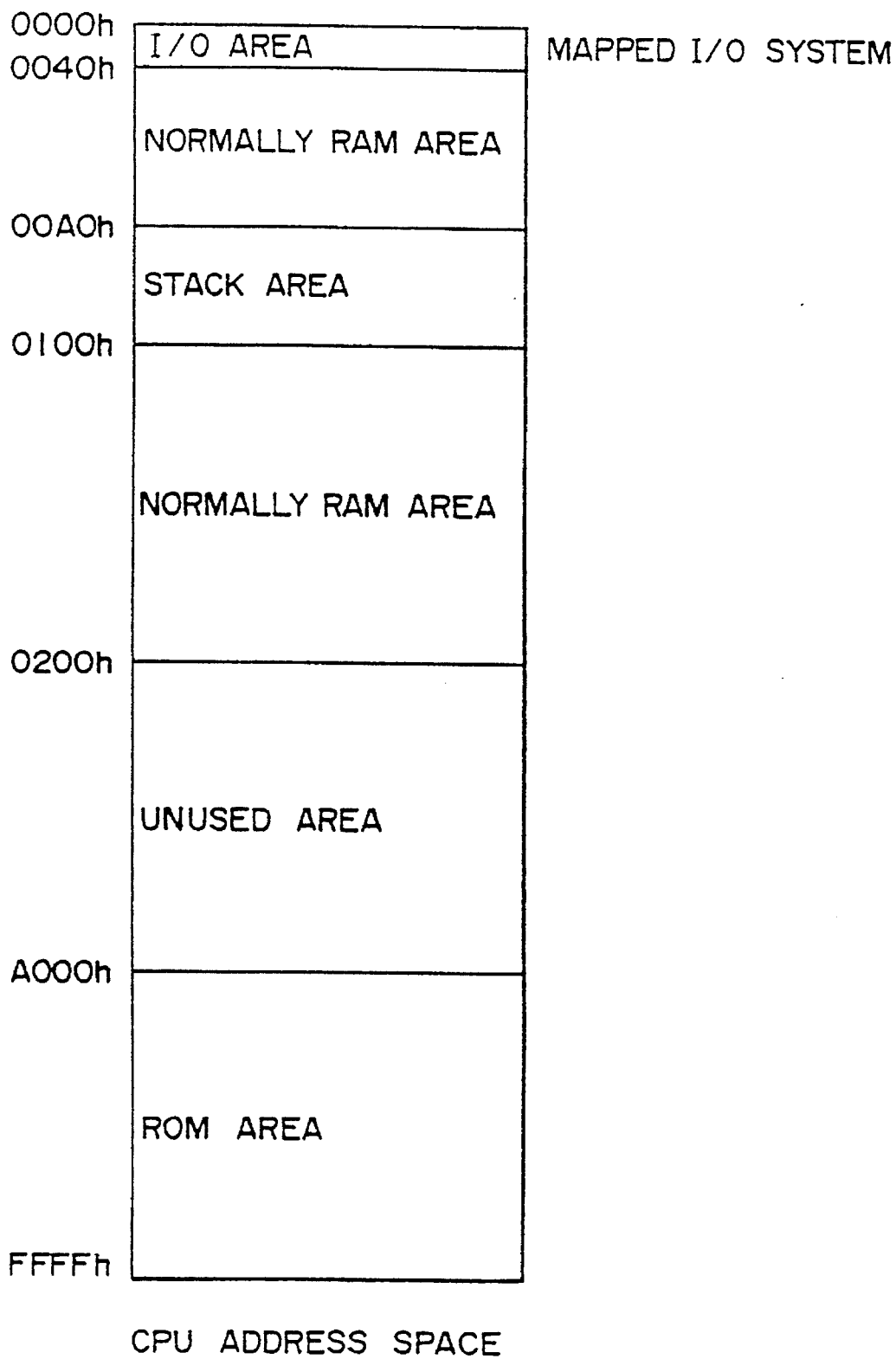
FIG. 7 is a diagram showing an address space in the body CPU in the control system shown in FIG. 4.
Figure 8:
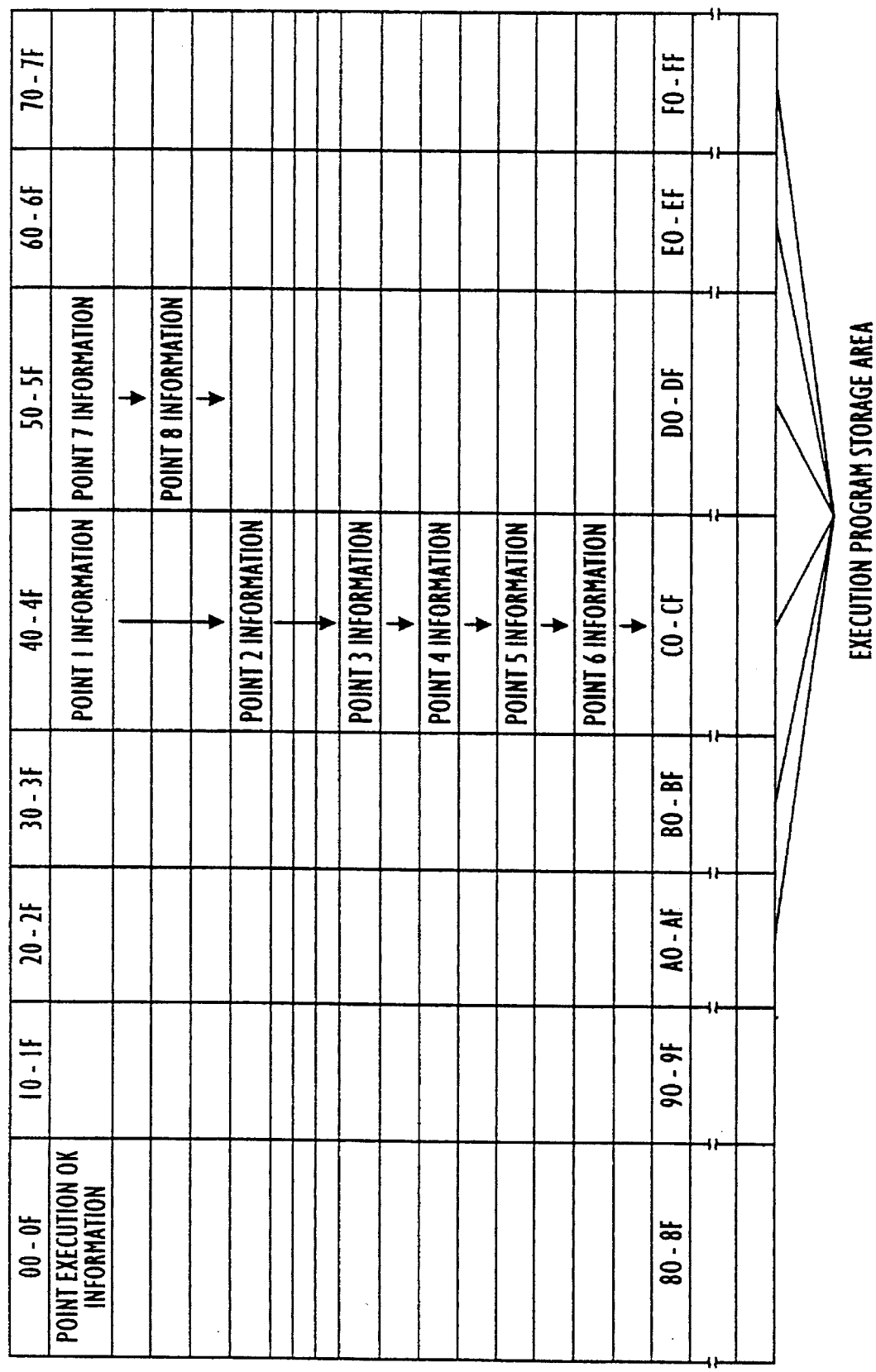
FIG. 8 is a map diagram showing memory areas in an electrically erasable programmable read-only memory (EEPROM) in the control system shown in FIG. 4.

The body CPU 20 has an address space as shown in FIG. 7. The EEPROM 86 stores each item of POINT information so that it can be rewritten in a test process described later on, as shown in FIG. 8.

Figure 9:
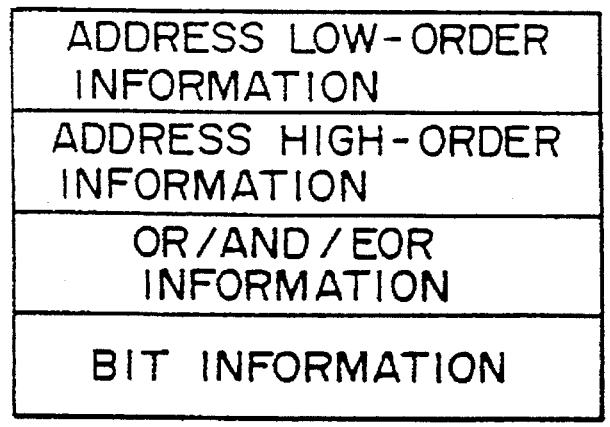
FIG. 9 is a diagram showing stored contents of POINT 1 and POINT 2 information shown in FIG. 8.

As shown in FIG. 9, address low-order information, address high-order information, logic information, and bit information are stored as each item of POINT 1 and POINT 2 information in the EEPROM 86. When the logic information is set to "00h", a logic "OR" is set. When the logic information is set to "01h", a logic "AND" is set. When the logic information is set to "02h", a logic "EOR" (Exclusive-OR) is set.

In the description below, an exemplary setting in the EEPROM for canceling a software bug will be discussed. In this embodiment, for example, at point 1, "9Fh" is stored as the address low-order information, "00h" as the address high-order information, "00h" as the logic information, and "00h" as the bit information (numerical information). At a POINT 2, "01h" is stored as the address low-order information, "00h" as the address high-order information, "00h" as the logic information, and "FFh" as the bit information (numerical information).

As described in detail later, the bit information at POINT 2 is set to "FFh" because, when the main switch 66 is turned OFF, or when the shutter release switch 54 or the photometric switch 52 is turned OFF even with the main switch 66 being turned ON, the directional data for the ports P00–P07 are originally set to "FFh" to cause ports P00–P07 to function as output ports for thereby outputting "0" data to prevent unwanted electric energy consumption. However, if the directional data for any of the ports P00–P07 are set to "0" due to a software bug, then that port will function as an input port, consuming electric energy, provided the associated switch is turned ON. To avoid such a situation, the bit information at POINT 2 is set to "FFh" to forcibly set the directional data for ports P00–P07 to "FFh".

Figure 10:
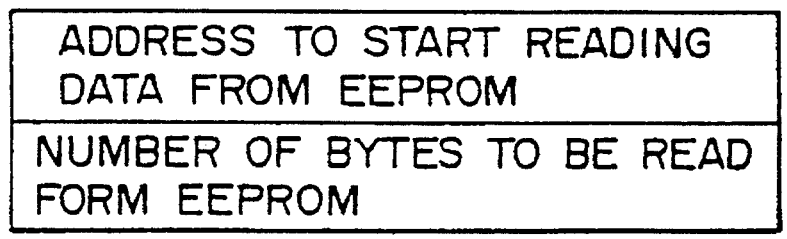
FIG. 10 is a diagram showing stored contents of POINT 3 and POINT 8 information shown in FIG. 8.

As shown in FIG. 10, address information to start reading data from the EEPROM 86 and the number of bytes read from the EEPROM 86 are stored as POINT 3 information through POINT 8 information. An execution program corresponding to each POINT (except for POINT 1 and POINT 2) is also stored as an additional routine by the preset number of bytes read from an indicated address to start reading data from the EEPROM 86.

The EEPROM 86 stores flag data (bit information) indicative of whether each of the POINT 1 through POINT 8 processes is to be executed, as shown in FIG. 11. If the bit information for each POINT is set to "0", then, as shown in FIG. 12, a corresponding POINT execution OK flag (F_POINT 1~8) is cleared to inhibit the execution of the POINT processes 1–8. If the bit information for each POINT is set to "1", then the corresponding POINT execution OK flag (F_POINT) is set to allow the execution of the POINT processes 1–8. In other words, if the flag data is set to "0", a predetermined process will not be executed, and if it is set to "1", the predetermined process will be executed.

The bit information stored in the EEPROM 86 can be rewritten as desired, for example, in the test process. In this embodiment, all bits of the bit information are initially set to "0", i.e., when the camera is shipped from the factory. Therefore, if there are no software bugs or additional functions, the POINT processes, i.e., the POINT 1 through POINT 8 processes, which are included in eight scattered (different) locations in the control sequence, are disabled (inhibited from being executed) when the camera is shipped from the factory.

In step S607 shown in FIG. 6, therefore, at least information as to each POINT and bit information indicative of whether each POINT process is to be executed are read from the EEPROM 86, and stored in a given area in the RAM as shown in FIG. 13.

Thereafter, control goes to the POFF loop which is repeatedly executed when the main switch 66 in the camera body 10 is turned OFF.

POFF LOOP

In the POFF loop, a test process is called in step S609. The test process will be described as a subroutine in detail later on. Then, a SW input process is called in step S611. In the SW input process, "1" or "0" is inputted depending on whether the shutter release switch 54, the photometric switch 54, the main switch 66, etc., are turned ON or OFF, and flags of these switches and various flags that are set depending on the operation of the switches are inputted to the body CPU 20. Thereafter, a POINT 1 process is called in step S613, and then, the display on the LCD panel 34 is controlled based on the data entered in the SW input process in step S615. Then, the main switch 66 is checked based on the data entered in the SW input process in step S617. If the flag of the main switch 66 is set to "0", i.e., if the main button 36 is in the OFF position, then a POINT 2 process is called in step S619. The POINT 1 process and the POINT 2 process will be described as subroutines in detail later on.

Even when the flag of the main switch 66 is set to "1", i.e., even when the main button 36 is in the GREEN or ON position, if both (1) the shutter release switch 54, and (2) the photometric switch 52 are turned OFF in steps S621, S623, then control goes to step S619 where the POINT 2 process is called. Then, a 128-ms timer is started in step S625, a power-hold mode is turned OFF in step S627, a low-power consumption mode is set in step S629, and the elapse of 128 ms is awaited in step S631. Upon elapse of 128 ms, a normal mode is set in step S633, and then the POFF loop is executed again. If either the shutter release switch 54 or the photometric switch 52 is turned ON while the POFF loop is being executed, a restart process shown in FIG. 14 is executed.

RESTART

Figure 14:
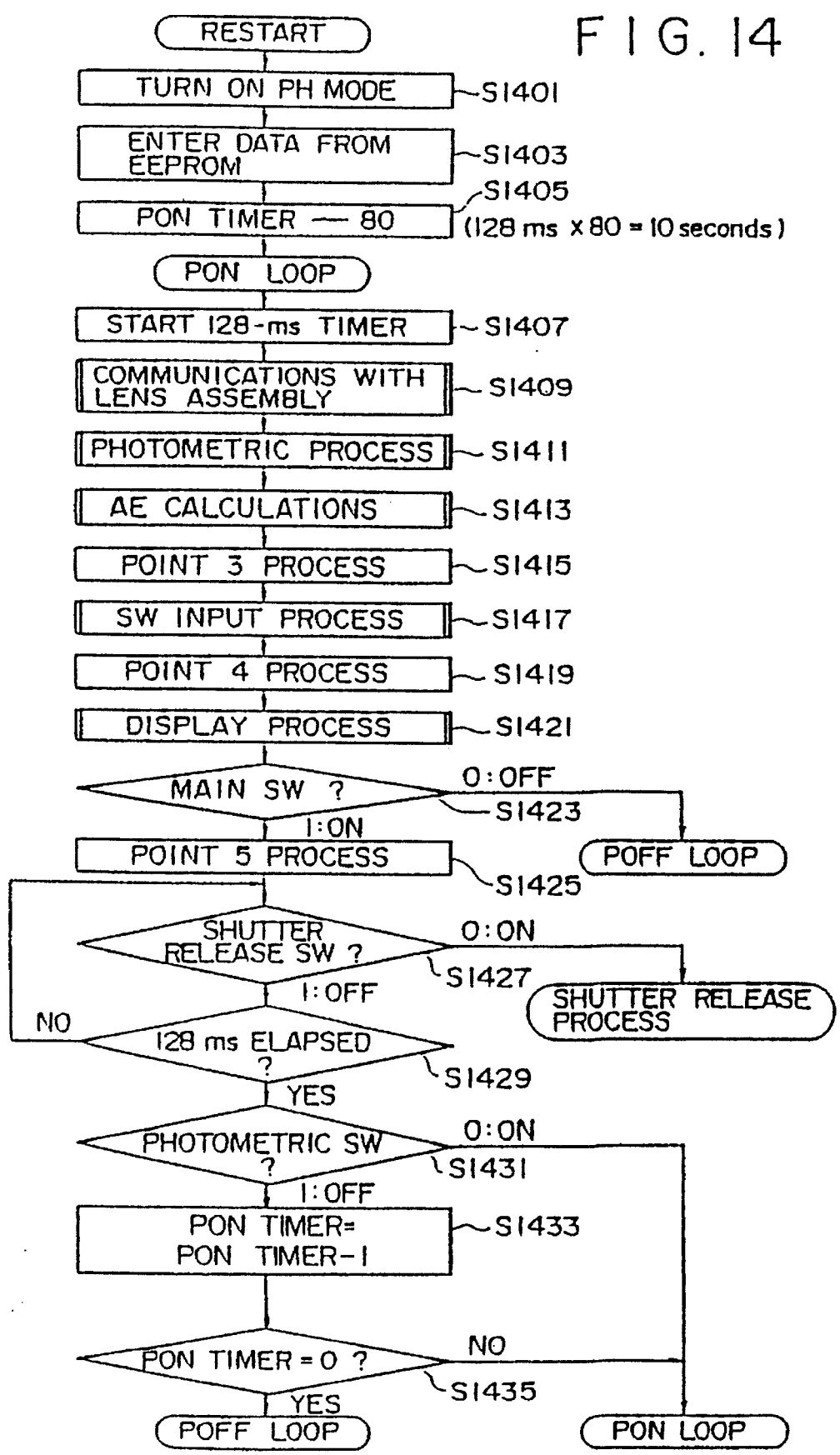
FIG. 14 is a flowchart of a restart process called in the main routine shown in FIG. 6.

FIG. 14 is a flowchart of the restart process. The restart process is executed if the flag of either the shutter release switch 54 or the photometric switch 52 is set to "1" with the flag of the main switch 66 being set to "1".

In the restart process, the power-hold mode is turned ON to energize the entire electric hardware of the camera in step S1401, and data stored in the EEPROM 86 is written in the RAM in the body CPU 20 in step S1403. Step S1403 is the same as step S607 shown in FIG. 6. Then, a counter PON timer is set to the number of times that the PON loop is to be repeated, i.e., "80" in this embodiment, in step S1405. Since a repetitive period of 128 ms, described below, of the PON loop is repeated 80 times, the PON loop is therefore repeatedly executed for about 10 seconds. Thereafter, control goes to the PON loop.

PON LOOP

In the PON loop, communications between the camera body 10 and the lens assembly 12 are carried out, a photometric process is effected, automatic exposure (AE) calculations for calculating a Tv/Av value based on the result of the photometric process are executed, and a shutter release process is performed.

First, in order to establish the repetitive period of the PON loop, a 128-ms timer is started in step S1407. Then, communications between the camera body 10 and the lens assembly 12 are carried out in step S1409.

A normal photometric process is carried out in step S1411 to enter subject brightness data in the form of digital values which are converted by the A/D converter 74 from output data supplied from the segmental photometric sensor 70 through the photometric circuit 72. Based on the entered subject brightness data, automatic exposure calculations are carried out in step S1413. Thereafter, a POINT 3 process is called in step S1415. The POINT 3 process will be described in detail as a subroutine later on.

Then, a SW input process is called in step S1417. In step S1417, as with the step S611, "1" or "0" is inputted depending on whether the shutter release switch 54, the photometric switch 54, the main switch 66, etc., are turned ON or OFF, and flags of these switches and various flags that are set depending on the operation of the switches are inputted to the body CPU 20. Thereafter, a POINT 4 process is called in step S1419, and then the display on the LCD panel 34 is controlled based on the data entered in the SW input process in step S1421.

Thereafter, the main switch 66 is checked based on the data entered in the SW input process in step S1423. If the flag of the main switch 166 is set to "0", i.e., if the main button 36 is in the OFF position, then control jumps to the POFF loop described above. If the flag of the main switch 66 is set to "1", i.e., if the main button 36 is in the ON position or the GREEN position, then a POINT 5 process is called in step S1425. The POINT 4 process and the POINT 5 process will be described in detail as subroutines later on.

If the shutter release button 26 is fully pressed in step S1427, i.e., if the shutter release switch 54 is turned ON, or the flag of the shutter release switch 54 is set to "0", then a shutter release process is executed. The shutter release process will be described in detail later on.

If the shutter release button 26 is partly pressed or not pressed at all in step S1427, i.e., if the shutter release switch 54 is turned OFF, or the flag of the shutter release switch 54 is set to "1", then the state of the shutter release switch 54 is monitored until the 128-ms timer runs out in step S1429. Upon elapse of 128 ms, if the photometric switch 52 is turned OFF, i.e., if the flag of the photometric switch 52 is set to "1", in step S1431, then the counter PON timer is decremented by 1 in step S1433. If the PON loop is repeated by the number of times to which the PON timer has been set in the step S1405, i.e., if the count of the counter PON timer is "0", in step S1435, then control goes to the POFF loop. If the photometric switch 52 is turned on in step S1431 or the count of the counter PON timer is not "0" in step S1435, then the PON loop is repeated.

SHUTTER RELEASE PROCESS

Figure 15:
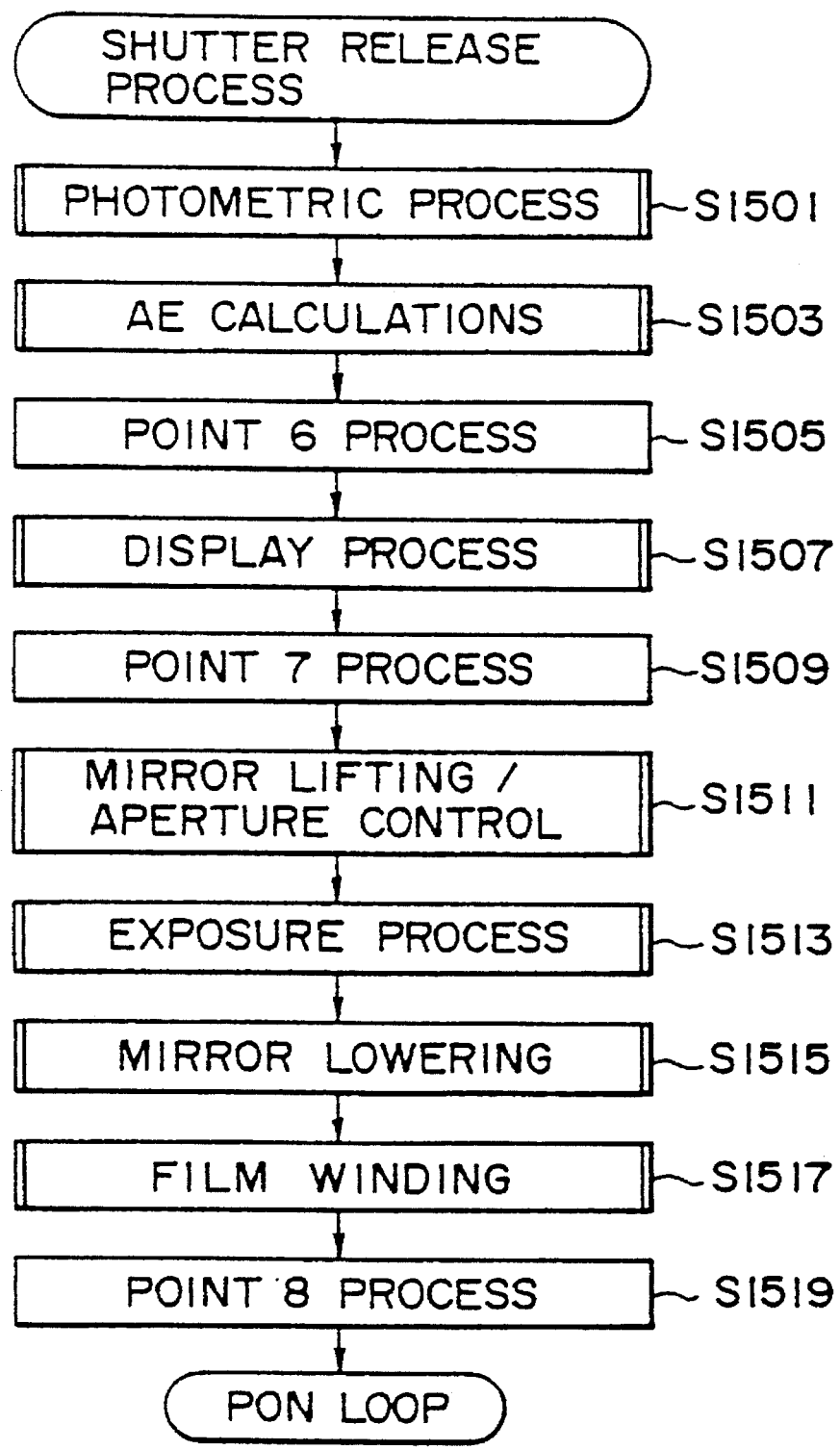
FIG. 15 is a flowchart of a shutter release process called in the restart process shown in FIG. 14.

FIG. 15 is a flowchart of the shutter release process. In the shutter release process, a photometric process and AE calculations are successively carried out in respective steps S1501, S1503, after which a POINT 6 process is called in step S1505. Thereafter, the result of the AE calculations is displayed on the LCD 34 in step S1507, and a POINT 7 process is called in step S1509.

Then, an exposure sequence is carried out by successively executing a mirror lifting/aperture control process in step S1511, an exposure process in step S1513, a mirror lowering process in step S1515, and a film winding process in step S1517. Finally, a POINT 8 process-is called in step S1519. After the shutter release process is finished, control goes to the PON loop shown in FIG. 14. The mirror lifting/aperture control process in step S1511 and the mirror lowering process in step S1515 will be described as subroutines in detail later on. Similarly, the point 6, 7, and 8 processes in steps S1505, S1509, and S1519 respectively, will also be described in detail as subroutines on.

TEST PROCESS

The test process called in step S609 in the main routine shown in FIG. 6 will be described as a subroutine with reference to FIG. 16.

In the test process, while the body CPU 20 is connected to the external computer 92 for communications therebetween, data, programs, etc. are written to or read from the EEPROM 86, and data is written to or read from the I/O and the RAM.

More specifically, when the test process is called, step S1601 checks whether there is a communication request or not. If there is no communication request, then the test process is finished, and control returns to the main routine shown in FIG. 6.

If there is a communication request in step S1601, detailed steps of the test process are carried out. First, a process code for indicating the writing of data in the EEPROM 86, a process code for indicating the reading of data from the EEPROM 86, a process code for indicating the writing of data in the I/O or the RAM, and a process code for indicating the reading of data from the I/O or the RAM are entered in step S1603. Then, step S1605 determines whether the writing of one byte in the EEPROM 86 has been indicated based on the entered process codes.

If the writing of one byte to the EEPROM 86 has been indicated in step S1605, then a writing address and data are entered through the external computer 92 in step S1607, the EEPROM 86 is put into a condition to write one byte in step S1609, and the address and data entered through the external computer 92 are inputted to the EEPROM 86 in step S1611. After the sequence to write the address and data in the EEPROM 86 is finished, control returns to the main routine shown in FIG. 6.

If the writing of one byte to the EEPROM 86 has not been indicated in step S1605, then step S1613 determines whether the reading of data from the EEPROM 86 has been indicated, based on the entered process codes. If the reading of data from the EEPROM 86 has been indicated in step S1613, then an address to start reading data from the EEPROM 86 and the number of bytes to be read are entered through the external computer 92 in step S1615. Then, data starting from the entered address are read from the EEPROM 86 by the entered number of bytes, and then transferred to the external computer 92 in step S1617. The sequence to read data from the EEPROM 86 is finished, and control returns to the main routine shown in FIG. 6.

If the reading of data from the EEPROM 86 has not been indicated in step S1613, then step S1619 determines whether the writing of one byte in the I/O or the RAM has been indicated based on the entered process codes. If the writing of one byte in the I/O or the RAM has been indicated in step S1619, then a writing address and data are entered through the external computer 92 in step S1621. Then, the entered address and data are written in the RAM in step S1623. The sequence to write the data in the RAM is now finished, and then control returns to the main routine shown in FIG. 6.

If the writing of one byte in the I/O or the RAM has not been indicated in the step S1619, then step S1625 determines whether the reading of data from the I/O or the RAM has been indicated based on the entered process codes. If the reading of data from the I/O or the RAM has been indicated in the step S1625, then an address to start reading data from the RAM and the number of bytes to be read are entered through the external computer 92 in step S1627. Then, data starting from the entered address are read from the RAM by the entered number of bytes, and then transferred to the external computer 92 in step S1629. After the sequence to read the data from the RAM is finished, control returns to the main routine shown in FIG. 6.

In the test process, therefore, with the body CPU 20 connected to the external computer 92 for communications therebetween, it is possible to write data, programs, etc. in or read data, programs, etc. from the EEPROM 86, and also to write data in or read data from the I/O and the RAM.

MIRROR LIFTING/APERTURE CONTROL PROCESS

Figure 17:
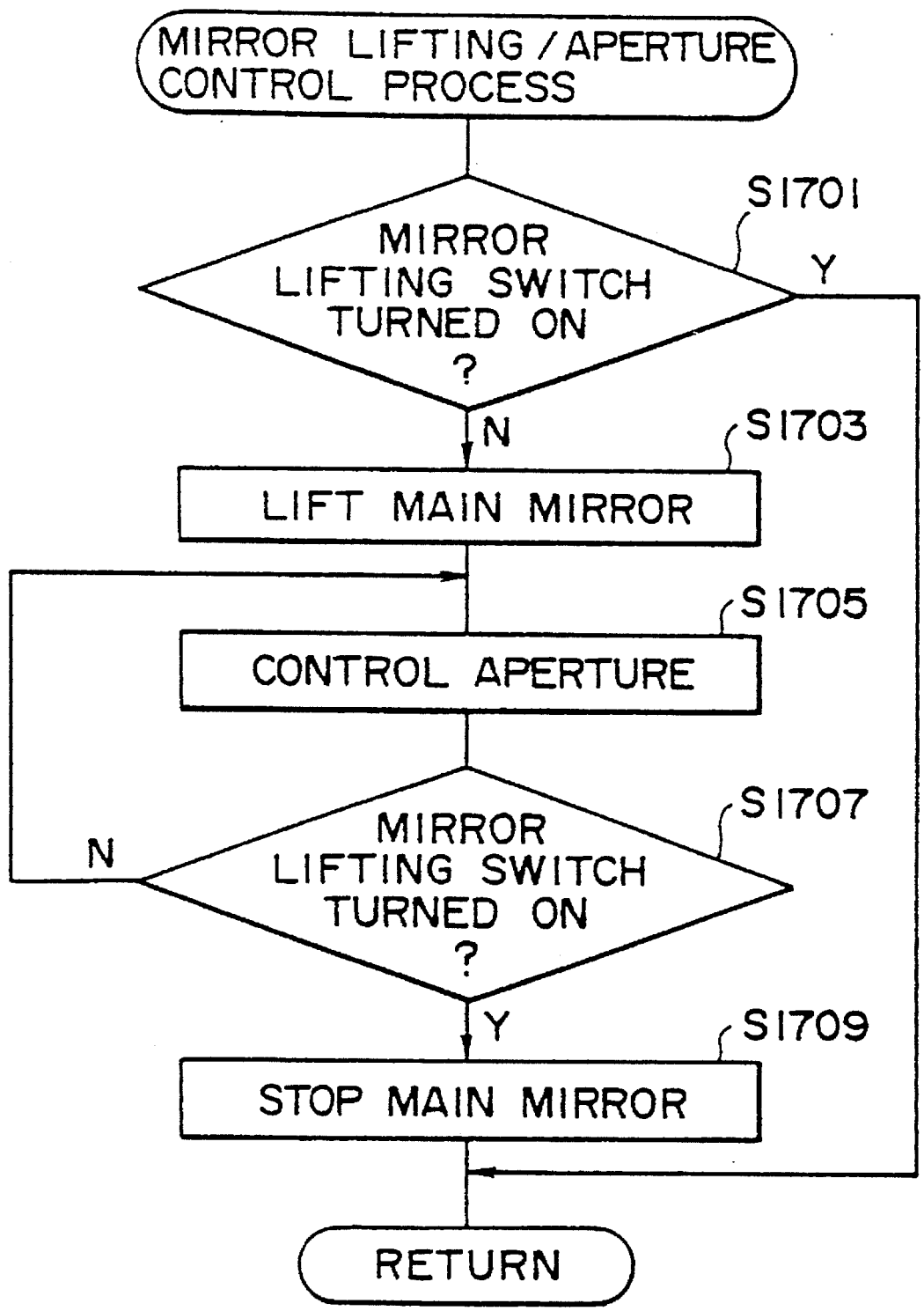
FIG. 17 is a flowchart of a mirror lifting/aperture control subroutine called in the shutter release process shown in FIG. 15.

The mirror lifting/aperture control process called in step S1511 of the shutter release process shown in FIG. 15 will be described as a subroutine in detail with reference to FIG. 17.

When the mirror lifting/aperture control process is called, a mirror lifting switch (not shown) is checked in step S1701. If the mirror lifting switch is turned ON, then, since the main mirror 68 is lifted, the mirror lifting/aperture control process is not executed, and control returns from the mirror lifting/aperture control process to the shutter release process.

If the mirror lifting switch is not turned ON, then, since the main mirror 68 is not lifted, the mirror motor is energized in a direction to lift the main mirror 68 in step S1703, thereby starting to lift the main mirror 68. In synchronism with the lifting of the main mirror 68, a process for controlling the aperture is started in step S1705. The process for controlling the aperture is completed until the mirror lifting switch is turned ON in step S1707. When the mirror lifting switch is turned ON, the lifting of the main mirror 68 is stopped in step S1709. When the mirror lifting/aperture control process is ended, control returns to the shutter release process.

MIRROR LOWERING PROCESS

Figure 18:
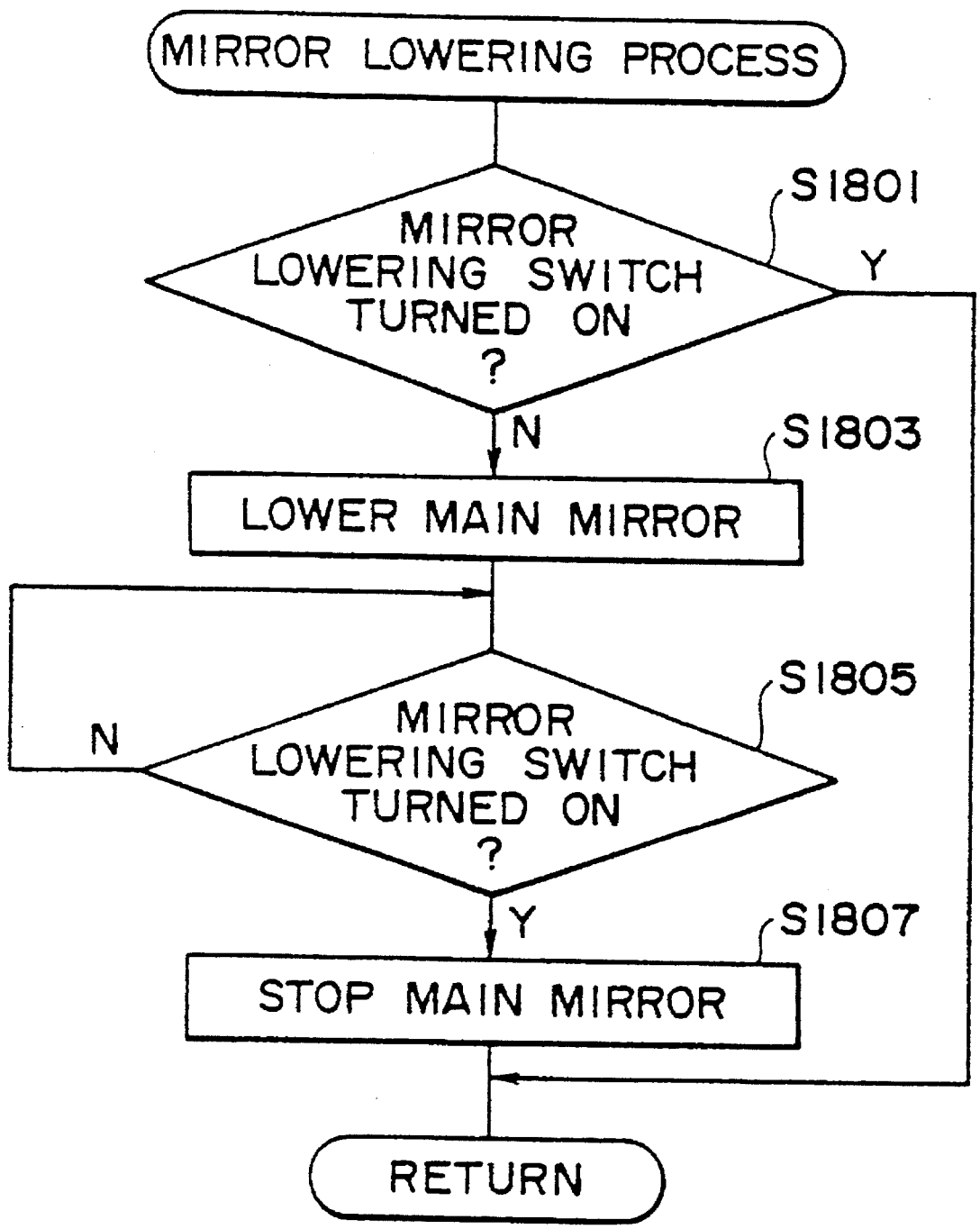
FIG. 18 is a flowchart of a mirror lowering subroutine called in the shutter release process shown in FIG. 15.

The mirror lowering process called in step S1515 of the shutter release process shown in FIG. 15 will be described as in detail a subroutine with reference to FIG. 18.

When the mirror lowering process is called, a mirror lowering switch (not shown) is checked in step S1801. If the mirror lowering switch is turned ON, then, since the main mirror 68 is lowered, the mirror lowering process is not executed, and control returns from the mirror lowering process to the shutter release process.

If the mirror lowering switch is not turned ON, then, since the main mirror 68 is not lowered, the mirror motor is energized in a direction to lower the main mirror 68 in step S1803, thereby starting to lower the main mirror 68. The main mirror 68 is continuously lowered until the mirror lifting switch is turned ON in step S1805. When the mirror lifting switch is turned ON, the lowering of the main mirror 68 is stopped in step S1807. When the mirror lowering process ends, control returns to the shutter release process.

POINT PROCESSES

According to the present invention, as described above, the POINT 1 through POINT 8 processes are included at various scattered locations in the control sequence. Each of the POINT 1 through POINT 8 processes will be described in specific detail below.

In the POINT 1 through POINT 8 processes described below, a given program is written in the EEPROM 86 without changing the program software stored in ROM. The program stored in the EEPROM 86 is selectively executed in a certain POINT process to eliminate a software bug or to add a special function or application to the existing program.

POINT 1 PROCESS AND POINT 2 PROCESS

Figure 19:
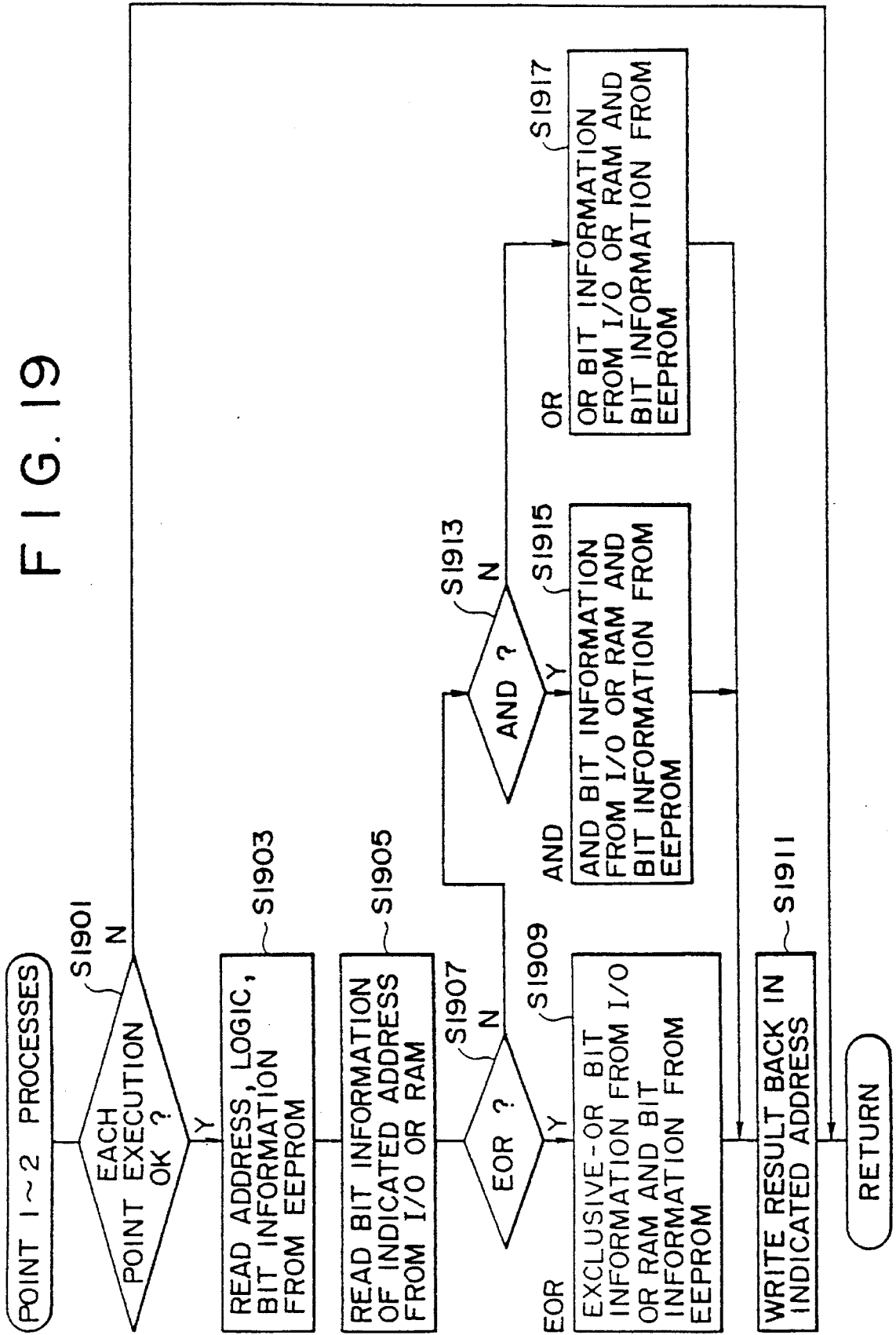
FIG. 19 is a flowchart of POINT 1 and POINT 2 processes as subroutines called in the main routine shown in FIG. 6.

Specific control sequences of the POINT 1 and POINT 2 processes will be described below with reference to FIG. 19. The control sequences of the POINT 1 and POINT 2 processes are similar to each other.

In each of the POINT 1 and POINT 2 processes, a predetermined processing sequence is carried out as described below using bit information read with respect to a corresponding POINT. When the POINT 1 process or the POINT 2 process is executed, step S1901 checks a corresponding POINT execution OK flag.

As described above, all bits of the bit information stored in the EEPROM 86 and indicative of whether each of the POINT 1 and POINT 2 processes is to be executed, are set to "0" in the absence of any software bugs or additional functions, when the camera is shipped from the factory. As a result, when data stored in the EEPROM 86 are written in the RAM in the body CPU 20 in step S607 of the main routine, the bit information is read from the EEPROM 86, and the POINT execution OK flags (F_POINT 1~2) corresponding respectively to POINT 1 and POINT 2 are cleared. Therefore, unless the bit information corresponding to the POINT execution OK flags has been rewritten, for example, as in the test process in step S609 of the main routine, control skips an auxiliary process of steps S1903–S1911 and returns from step S1901 (No) to the main routine. The POINT 1 and POINT 2 processes are then terminated.

If the bit information corresponding to the POINT execution OK flags has been rewritten as "1", then control proceeds from step S1901 (Yes) to execute the auxiliary process described below. First, information corresponding to each POINT, i.e., address low-order information, address high-order information, logic information, and bit information as shown in FIG. 9 are read from the EEPROM 86 in step S1903, and bit information representative of the address indicated in step S1903 is read from the RAM in step S1905.

Then, step S1907 determines whether the logic information read in step S1903 is a logic "EOR". If the logic information is a logic "EOR" (Yes), then the bit information read from the RAM and the bit information read from the EEPROM 86 are exclusive-ORed in step S1909. The result of the exclusive-ORing operation is written back in the address in the RAM which is indicated for each POINT in the EEPROM 86 in step S1911. Then, control returns from the POINT 1 and POINT 2 processes to the main routine.

In this manner, the bit information in the RAM is rewritten by the result which is produced by exclusive-ORing the bit information in the RAM and the bit information stored in the EEPROM 86.

If the logic information is not a logic "EOR" in step S1907 (No), then step S1913 determines whether the logic information read in the step S1903 is a logic "AND". If the logic information is a logic "AND" (Yes), then the bit information read from the RAM and the bit information read from the EEPROM 86 are ANDed in step S1915. The result of the ANDing operation is written back in the address in the RAM which is indicated for each POINT in the EEPROM 86 in step S1911. Then, control returns from the POINT 1 and POINT 2 processes to the main routine.

If the logic information read in step S1903 is not a logic "AND" in step S1913 (No), then, since the logic information is a logic "OR", the bit information read from the RAM and the bit information read from the EEPROM 86 are ORed in step S1917. The result of the ORing operation is written back in the address in the RAM which is indicated for each POINT in the EEPROM 86 in step S1911. Then, control returns from the POINT 1 and POINT 2 processes to the main routine.

EXAMPLE OF OPERATIONS OF POINT 1 AND POINT 2 PROCESSES

An example of an operation to be carried out when the execution of the POINT 1 and POINT 2 processes is permitted, i.e., when the POINT execution OK flags (F_POINT 1~2) are set, will be described below. In this example, it is assumed that the directional data for any of the ports P00~P07, which should have been set to "FFh", are set to "0" due to a software bug.

In the POINT 1 process, when step S1903 is executed, "9Fh" is read as address low-order information from the EEPROM 86, "00h" as address high-order information from the EEPROM 86, "00h" as logic information from the EEPROM 86, and "00h" as bit information from the EEPROM 86. When step S1905 is executed, bit information is read from address "009Fh" of the RAM. Since "00h" has been read as the logic information from the EEPROM 86, a logic "OR" is set in the POINT 1 process. As a result, control goes from step S1907 (No) through step S1913 (No) to step S1917, in which the bit information read from address "009Fh" of the RAM and the bit information "00h" read from the EEPROM 86 are ORed.

As a result, the bit information written back in the indicated address in the RAM in the step S1911 is the same as the bit information read from address "009Fh" of the RAM. Stated otherwise, a processing sequence which is equivalent to the non-execution of the POINT 1 process is carried out in the POINT 1 process.

In the POINT 2 process, when step S1903 is executed, "01h" is read as address low-order information from the EEPROM 86, "00h" as address high-order information from the EEPROM 86, "00h" as logic information from the EEPROM 86, and "FFh" as bit information from the EEPROM 86. When step S1905 is executed, bit information is read from an address "0001h" of the RAM. Since "00h" has been read as the logic information from the EEPROM 86, a logic "OR" is set in the POINT 2 process. As a result, control goes from step S1907 (No) through step S1913 (No) to step S1917, in which the bit information read from address "0001h" of the RAM and the bit information "FFh" read from the EEPROM 86 are ORed.

As a result, the bit information written back in the indicated address in the RAM in step S1911 becomes "FFh", replacing whatever bit information read from the address "0001h" of the RAM.

Stated otherwise, when the main switch 66 is turned OFF, or when the shutter release switch 54 or the photometric switch 52 is turned OFF even with the main switch 66 being turned ON, and after the SW input process, directional data for the ports P00~P07 are originally set to "FFh" to cause the ports P00~P07 to function as output ports for minimizing electric energy consumption. Even if the directional data for any of ports P00~P07 are set to "0" due to a software bug, the directional data for ports P00~P07 are forcibly set to "FFh" without software modifications or changes by rewriting the EEPROM 86 to set the POINT execution OK flag corresponding to the POINT 2 and executing the POINT 2 process.

By thus executing the POINT 2 process, after the SW input process, the ports which are originally supposed to function as output ports continue reliably to function as output ports without functioning as input ports due to a software bug. Consequently, any unwanted electric energy consumption which would otherwise be caused when the main switch 66 is turned OFF, or when the shutter release switch 54 or the photometric switch 52 is turned OFF even with the main switch 66 being turned ON is effectively prevented from occurring, thus minimizing the electric energy consumption. The net result is that a software bug is virtually eliminated simply by rewriting the EEPROM 86.

In the illustrated embodiment, since the POINT 2 process is located as described above in the main routine shown in FIG. 6, it allows a program and bit information to be determined in advance to cope with a situation in which ports supposed to function as output ports function as input ports owing to a software bug that may occur in the SW input process. The present invention is however not limited to such an arrangement. More specifically, it is difficult to predict the location where a software bug is produced and the condition in which it occurs. According to the present invention, a plurality of POINT processes are located in the main routine, and when a software bug is found (the bug may be found while the program is being generated or after the product is on the market), a program for removing the bug is rewritten in the EEPROM 86 in the test process so as to be executed in an optimum POINT process, and is executed by setting the POINT execution OK flag relative to that POINT process. The above bit arrangement and program and a bit arrangement or program which are not embodied (described later on) are arranged in order to be able to subsequently write such a desired program.

POINT 3 PROCESS THROUGH POINT 8 PROCESS

Specific control sequences of the POINT 3 through POINT 8 processes will be described below with reference to FIG. 20. The control sequences of the POINT 3 through POINT 8 processes are similar to each other.

In each of the POINT 3 through POINT 8 processes, a predetermined auxiliary processing sequence is carried out as described below based on program information that is read with respect to each POINT. When any one of the POINT 3 through POINT 8 processes is executed, the corresponding POINT execution OK flag is checked in step S2001 in the same manner as the POINT 1 or POINT 2 process.

Unless the bit information corresponding to the POINT execution OK flag has been rewritten, control returns from step S2001 (No) to the restart process or the shutter release process. Therefore, processings respectively included in the POINT 3 through POINT 8 processes are not executed.

If the bit information corresponding to the POINT execution OK flag has been rewritten as "1", control proceeds from step S2001 (Yes) to execute the auxiliary control sequence described below. First, a stack pointer in the RAM is reset to a highest location in step S2003, and then an address to start reading data from the EEPROM 86, and the number of bytes to be read from the EEPROM 86, as shown in FIG. 10, are read as information corresponding to each POINT from the EEPROM 86 in order to determine a program area corresponding to each POINT on the EEPROM 86 in step S2005. Then, a supplemental program information is downloaded from the EEPROM 86 from the starting address indicated in step S2005 by the indicated number of bytes into an area of the RAM which starts from a certain address, i.e., a stack area {address 00A0h} in this embodiment, in step S2007.

Thereafter, the supplemental program downloaded into the RAM in step S2007 is called and executed in step S2009, and the control sequence comes to an end. In this embodiment, a stack area is opened by resetting the stack pointer to a highest location in step S2003, and the storage area of the RAM which is used is saved by reading the program information from the EEPROM 86 into the stack area and executing the read program information. However, the present invention is not limited to such an arrangement. Insofar as a sufficient general RAM area is available, the program information from the EEPROM 86 may be read into the general RAM area. In such a modification, step S2003 of resetting the stack point to a highest location becomes unnecessary, and it is possible to execute the POINT 3 through POINT 8 processes as subroutines themselves.

EXAMPLE OF AN OPERATION OF A POINT 3 PROCESS

An example of an operation to be carried out when the execution of the POINT 3 through POINT 8 processes is permitted, i.e., when the POINT execution OK flags (F_POINT 3–8) are set, will be described below. In this process, a control sequence for forcibly lifting the main mirror 68 is defined as an additional function.

Figure 21:
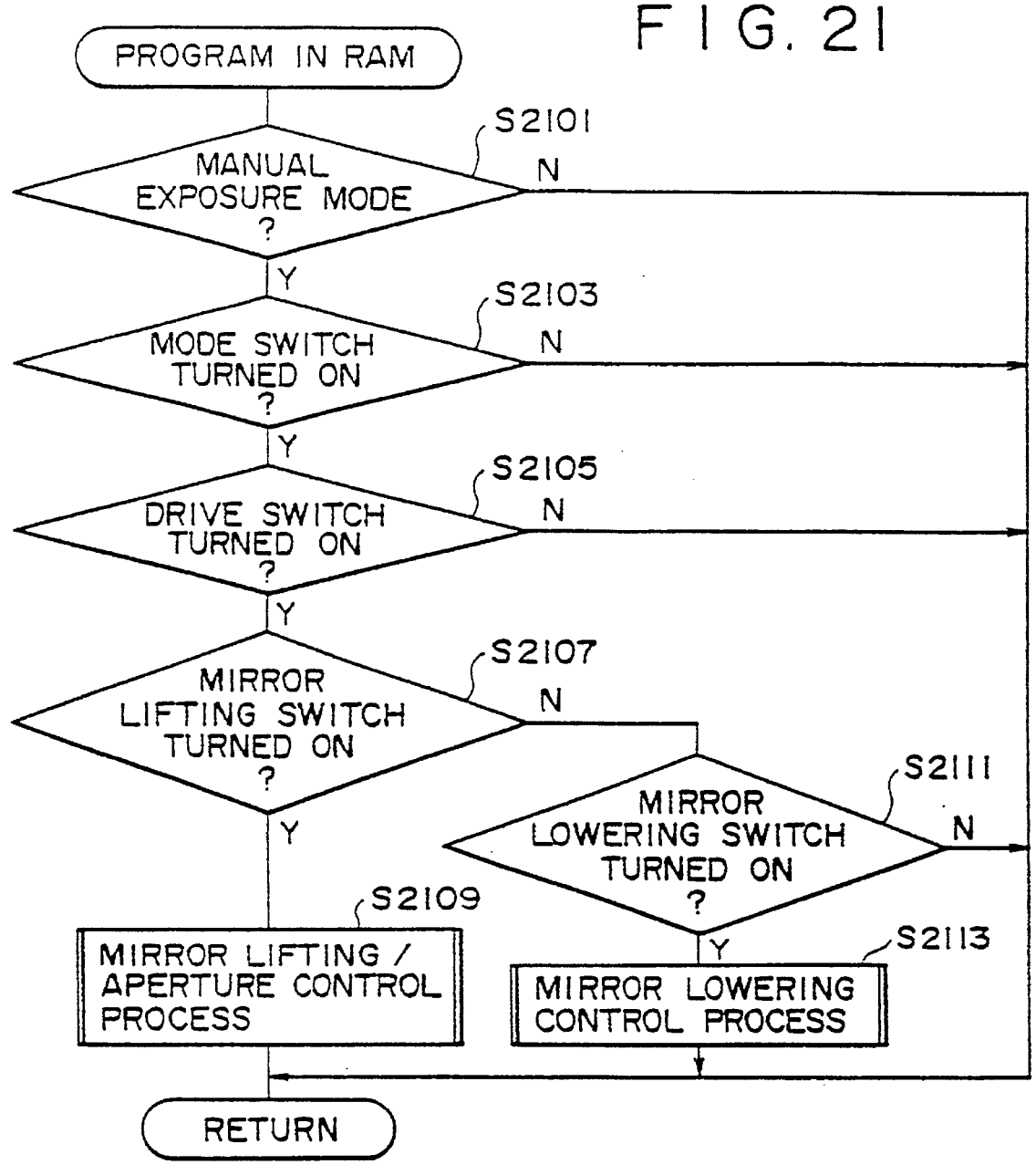
FIG. 21 is a flowchart of a program in the RAM of the POINT 3 process which is executed in the restart process shown in FIG. 14.

An exemplary program information read from the EEPROM 86, i.e., the supplemental program downloaded in RAM, when step S2007 of the POINT 3 process, is executed is shown in FIG. 21. The supplemental program executed in the POINT 3 process will be described in specific detail below.

The function of forcibly lifting the main mirror 68 is required especially when the noise produced when the main mirror 68 is retracted, is to be reduced when taking pictures, e.g., in a silent environment, such as during a music performance or the like.

When this process is executed, step S2101 determines whether the exposure mode is set to a manual exposure mode. If the exposure mode is not set to a manual exposure mode, i.e., if the exposure mode is set to an automatic photographing mode or a program photographing mode, since the main mirror 68 cannot be lifted for photometric operation, the automatic photographing mode or the program photographing mode cannot be carried out. Therefore, if the exposure mode is not set to a manual exposure mode, the control sequence for forcibly lifting the main mirror 68 cannot be carried out. Accordingly, this control sequence is immediately canceled, and control returns to the restart process.

If the exposure mode is set to a manual exposure mode in step S2101, and the mode button 40 and the drive button 38 are simultaneously pressed to turn ON the mode switch 62 and the drive switch 64 in steps S2103, S2105 (Yes), then the starting conditions are met, and a process of lifting the main mirror 68 is activated. Step S2107 determines whether the mirror lifting switch 88 is turned ON. If the mirror lifting switch 88 is turned ON, then it is determined that the forced lifting of the main mirror 68 is indicated, and the subroutine of the mirror lifting/aperture control process is called and executed in step S2109. The subroutine of the mirror lifting/aperture control process is the same as the control sequence shown in FIG. 17 of the mirror lifting/aperture control process in step S1511 in the shutter release process described above.

When the mirror lifting/aperture control process is executed in step S2109, the main mirror 68 is forcibly lifted. After the mirror lifting/aperture control process is executed, control returns to the restart process.

If the mirror lifting switch 88 is not turned ON in the step S2107, then step S2111 determines whether the mirror lowering switch 90 is turned ON or not. If mirror lowering switch 90 is turned ON, then it is determined that the forced lowering of the main mirror 68 is indicated, and the subroutine of the mirror lowering process is called and executed in step S2113. The subroutine of the mirror lowering process is the same as the control sequence shown in FIG. 18 of the mirror lowering process in step S1515 in the shutter release process described above.

When mirror lowering process is executed in the step S2113, the main mirror 68 is forcibly lowered. After the mirror lowering process is executed, control returns to the restart process.

If the mode switch 62 is turned OFF in step S2103 (No) or the drive switch 64 is turned OFF in step S2105 (No), then since the starting conditions are not met, the control sequence is canceled, and control returns to the restart process.

If both the mirror lifting switch 88 and the mirror lowering switch 90 are turned OFF in steps S2107, S2111 (No), then, though the starting conditions are met, since the lifting or lowering of the main mirror 68 is not indicated, the control sequence is canceled, and control returns to the restart process. Note that any operation which would conflict with the added function in the main program will be skipped when the POINT 3 process is executed.

With the POINT 3 process being thus arranged, the control sequence of forcibly lifting the main mirror 68 can be executed as an additional function simply by rewriting data stored in the EEPROM 86 without the need for any program modifications or changes. The forced lifting of the main mirror 68 is advantageous particularly when pictures are to be taken while reducing the noise produced by the movement of the main mirror 68, e.g., in a silent environment, such as during a music performance or the like.

EXAMPLES OF THE OPERATIONS OF POINT 4, 7, AND 8 PROCESSES

Figure 22:
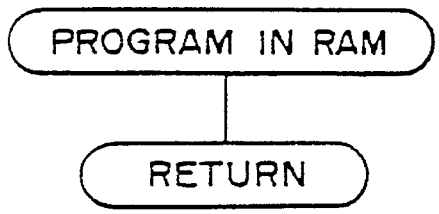
FIG. 22 is a flowchart of a program in the RAM of the POINT 4 process executed in the restart process shown in FIG. 14 and the POINT 7 and POINT 8 processes executed in the shutter release process shown in FIG. 15.

The program information read from the EEPROM 86, (i.e., the program stored in RAM), when the step S2007 of the POINT 4 process, the POINT 7 process, and the POINT 8 process is executed, is shown in FIG. 22. Examples of a supplemental program executed in the POINT 4 process, the POINT 7 process, and the POINT 8 process will be described below.

When the subroutine is called, any specific control sequence as an auxiliary process is executed, and control returns directly to the restart process or the shutter release process. Stated otherwise, in the POINT 4 process, the POINT 7 process, and the POINT 8 process, essentially the same operation as when the POINT execution OK flags are cleared in the step S2001 is carried out.

EXAMPLE OF AN OPERATION OF A POINT 5 PROCESS

Figure 23:
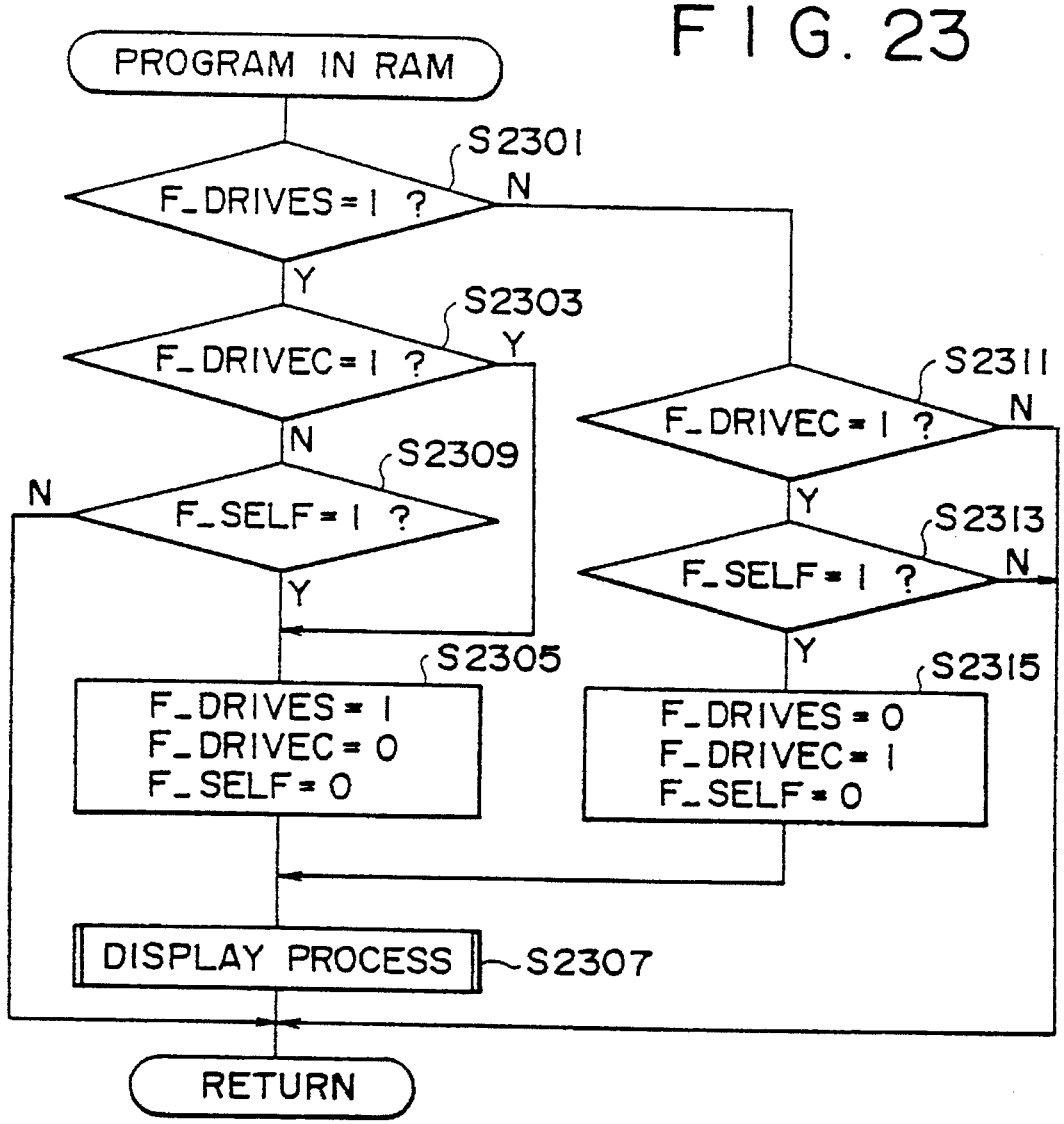
FIG. 23 is a flowchart of a program in the RAM of the POINT 5 process which is executed in the restart process shown in FIG. 14.

The program information read from the EEPROM 86 when the step S2007 of the POINT 5 process is executed, (i.e., the program stored in the memory area of the EEPROM 86 which is indicated when the step S2005 of the POINT 5 process is executed), is shown in FIG. 23. An example of a program executed as a subroutine in the POINT 5 process will be described below. In this subroutine, a control sequence is defined for removing a bug which is produced when the drive mode is set to a certain photographing mode.

Figure 24:
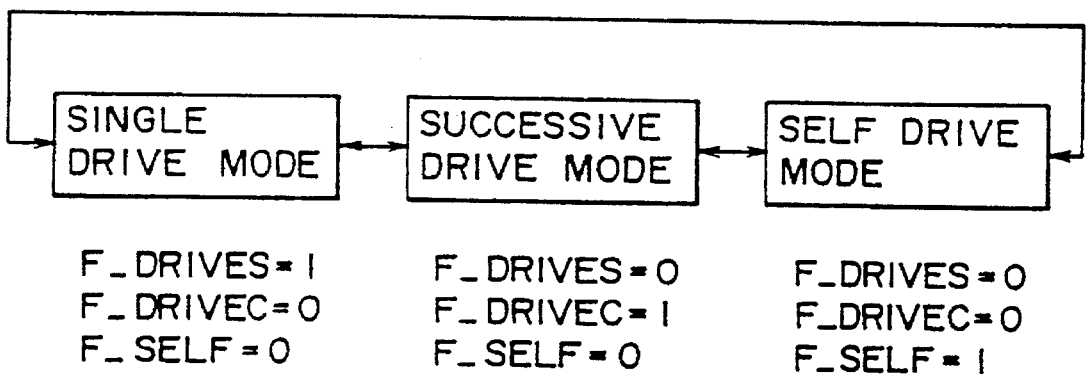
FIG. 24 is a diagram illustrative of the manner in which a drive mode required for the POINT 5 process shown in FIG. 23 is changed.

Prior to describing the subroutine shown in FIG. 23, the manner in which the drive mode switches between a plurality of photographing modes will be described below with reference to FIG. 24.

When the rocker switch 28 is turned to the left or right while the drive button 38 is being pressed to turn on the drive switch 64, the UP switch 58 or the DOWN switch 60 is turned ON to cause the drive mode to switch successively between a single-picture photographing mode (single drive mode), a successive-picture photographing mode (successive drive mode), and a self-timer photographing mode (self drive mode).

The drive mode is set to the single drive mode when a flag F_DRIVES for indicating the single drive mode is set, a flag F_DRIVEC for indicating the successive drive mode is cleared, and a flag F_SELF for indicating the self drive mode is cleared. The drive mode is set to the successive drive mode when flag F-DRIVES is cleared, flag F-DRIVEC is set, and flag F_SELF is cleared. The drive mode is set to self drive mode when flag F-DRIVES is cleared, the flag F-DRIVEC is cleared, and flag F_SELF is set.

Therefore, only one of the three flags corresponding to the respective three drive modes that can be selected one at a time is set whereas the other two flags are cleared. These flags can be set depending on whether the UP switch 58, the DOWN switch 60, and the drive switch 64 are turned ON or OFF as indicated by the SW input process in step S1417 of the restart process shown in FIG. 14. However, two of these three flags may possibly be set simultaneously due to a software bug.

If two of the flags relative to the drive modes are simultaneously set, then, since the body CPU 20 is unable to determine the order of priority as to which of the two set flags is to be selected, a desired drive mode may not be selected, thereby making it impossible to actuate the camera, or two drive modes corresponding to the two set flags may be displayed on the LCD 34, thereby confusing the user.

According to the present invention, when such a software bug occurs, a condition in which only one flag is set is accomplished by executing the POINT 5 process without the need to modify the original program software.

When the supplemental program for the POINT 5 process is executed, step S2301 determines whether flag F_DRIVES is set. If flag F_DRIVES is set, then step S2303 determines whether flag F_DRIVEC is set. If flag F_DRIVEC is set, then since two flags have simultaneously been set due to a software bug, flag F_DRIVES is set and flags F_DRIVEC, F_SELF are cleared in step S2305. Then, the flag set condition is displayed in step S2307. The control sequence of the subroutine is now ended, and control returns to the restart process.

If the flag F_DRIVEC is not set in the step S2303, step S2309 determines whether flag F_SELF is set. If flag F_SELF is cleared, then, since there is no software bug problem, the control sequence of the subroutine is finished, and control returns to the restart process. On the other hand, if flag F_SELF is set in step S2309, however, then since two flags have simultaneously been set due to a software bug, control goes to step S2305, in which flag F_DRIVES is set and flags F_DRIVEC, F_SELF are cleared. Then, the flag set condition is displayed in step S2307. The control sequence is now over, and control returns to the restart process.

Therefore, if flag F_DRIVES and one of the flags F_DRIVEC, F_SELF are simultaneously set, the single drive mode is given priority, and forcibly set.

If flag F_DRIVES is cleared in step S2301, step S2311 determines whether flag F_DRIVEC is set. If flag F_DRIVEC is cleared, then, since there is no software bug problem, the control sequence of the subroutine is finished, and control returns to the restart process. If flag F_DRIVEC is set in step S2311, then step S2313 determines whether flag F_SELF is set. If flag F_SELF is cleared, then, since there is no software bug problem, the control sequence of the subroutine is finished, and control returns to the restart process. On the other hand, if flag F_SELF is set in step S2313, then, since two flags have been set simultaneously due to a software bug, control goes to step S2315 in which flag F_DRIVEC is set and flags F_DRIVES, F_SELF are cleared. Then, the flag set condition is displayed in the step S2307. The control sequence of the subroutine is now over, and control returns to the restart process.

Therefore, if flag F_DRIVEC and flag F_SELF are simultaneously set, the successive drive mode is given priority, and forcibly set.

Consequently, even when a software bug occurs in which two drive flags are simultaneously set, a condition in which only one drive flag is set is accomplished by executing the POINT 5 process without the need to modify the program software.

As described above with respect to the POINT 2 process, a program for removing a bug can generally be designed only after the bug occurs. According to the present invention, however, a program is written in advance to include the POINT 5 process located in the restart process as described above, so that even when a bug occurs with respect to drive flags, additional software can be easily added to eliminate the bug without the need to change the original program software.

EXAMPLE OF AN OPERATION OF A POINT 6 PROCESS

Figure 25:
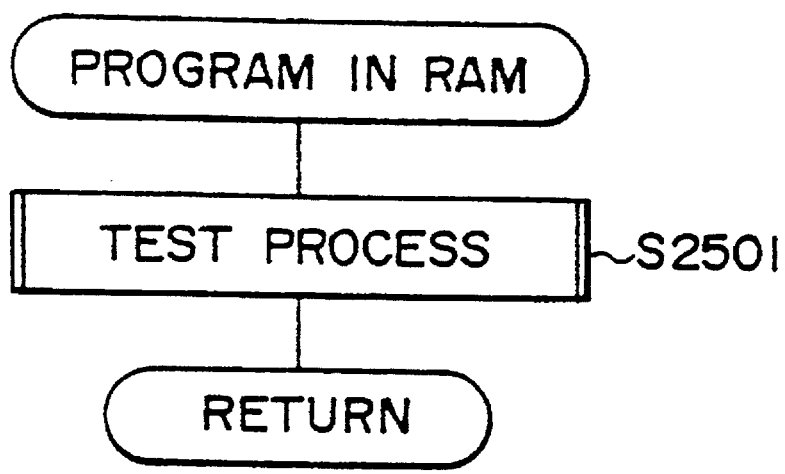
FIG. 25 is a flowchart of a program in the RAM of the POINT 6 process which is executed in the shutter release process shown in FIG. 15.

The program information read from the EEPROM 86 when step S2007 of the POINT 6 process is executed, i.e., the program stored in the memory area of the EEPROM 86 which is indicated when step S2005 of the POINT 5 process is executed, is shown in FIG. 25. An example of a program executed as a subroutine in the POINT 6 process will be described below.

Figure 16:
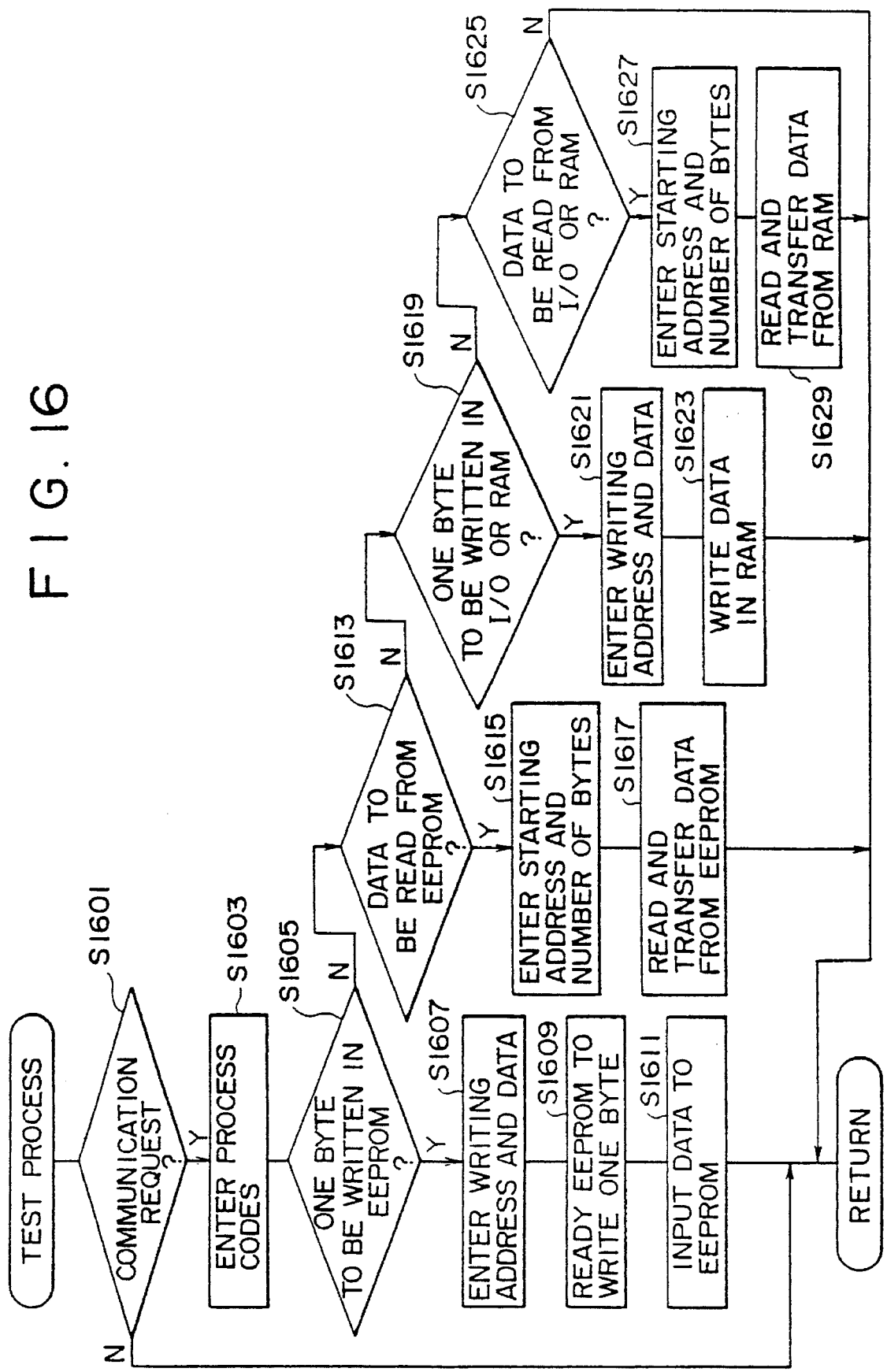
FIG. 16 is a flowchart of a test subroutine called in the main routine shown in FIG. 6.

When this subroutine is called, the test process shown in FIG. 16 is executed in step S2501, and control returns to the shutter release process. Stated otherwise, the same operation as the test process executed in step S609 of the main routine is carried out in the POINT 6 process, except that the test process executed in step S609 of the main routine is carried out in the POFF loop, whereas the test process executed in the POINT 6 process is carried out in the shutter release process in the PON loop.

If the results stored in the RAM of the photometric process and the AE calculations used for shutter release control (exposure control) are to be confirmed when debugging the software being produced or inspecting the camera being manufactured, then the results can be confirmed by including the step of the test process in the POINT 6 process. Specifically, by inserting the test process in the POINT 6 process, effecting communications between the external computer 92 and the body CPU 20 upon a shutter release, and transmitting a process code for reading data from the RAM, it is possible to read the RAM data from the body CPU 20 on the side of the external computer 92 for confirming the results of the AE calculations.

The principles of the present invention are not limited to the specific details of the illustrated embodiment. However, various changes and modifications may be made in the illustrated embodiment described above without departing from the scope of the present invention.

For example, in the illustrated embodiment, a certain process is carried out using bit information read in the POINT 1 process and the POINT 2 process, and a certain process is carried out using program information read in the POINT 3 through POINT 8 processes. However, a certain process may be carried out using bit information read in the POINT 3 through 8 processes, and a certain process is carried out using program information read in the POINT 1 process and POINT 2 process. Alternatively, a certain process may be carried out using program information read in all the POINT 1 through POINT 8 processes.

While the illustrated embodiment discloses a program using only one of three items of logic information, i.e., "EOR", "OR", and "AND", in the POINT 2 process, the present invention is not limited to the selection from such three items of logic information. It is possible to use other logic information. It is also possible to execute a program using a plurality of items of logic information.

In the above illustrated embodiment, the non-execution of a certain POINT process is indicated by the clearing of a corresponding POINT execution OK flag. However, when a certain process is executed on the basis of bit information which is read, virtually no process is executed, i.e., the same process as when a POINT execution OK flag is cleared is executed, by storing "00h" as logic information and "00h" as bit information, as with the POINT 1 process. Therefore, it is possible to omit the step of determining the POINT execution OK flag. When a certain process is executed on the basis of program information which is read, virtually no process is executed, i.e., the same process as when a POINT execution OK flag is cleared is executed, by carrying out no specific control sequence, but returning directly to the restart process or the shutter release process, as with the POINT 4 process (POINT 7 process or POINT 8 process). Therefore, it is possible to omit the step of determining the POINT execution OK flag.

In the illustrated embodiment, even if the directional data for any of the ports P00–P07 are set to "0" due to a software bug when the main switch 66 is turned OFF, or when the shutter release switch 54 or the photometric switch 52 is turned OFF even with the main switch 66 being turned ON, the directional data for all the ports can forcibly be set to "FFh" without software modifications or changes by setting the logic information to "00h" and the bit information to "FFh" in the POINT 2 process. However, the present invention is not limited to such a bug removal process based on bit information which is read. Instead, according to a modification shown in FIG. 26, a bug removal process may be carried out based on program information which is read.

Figure 20:
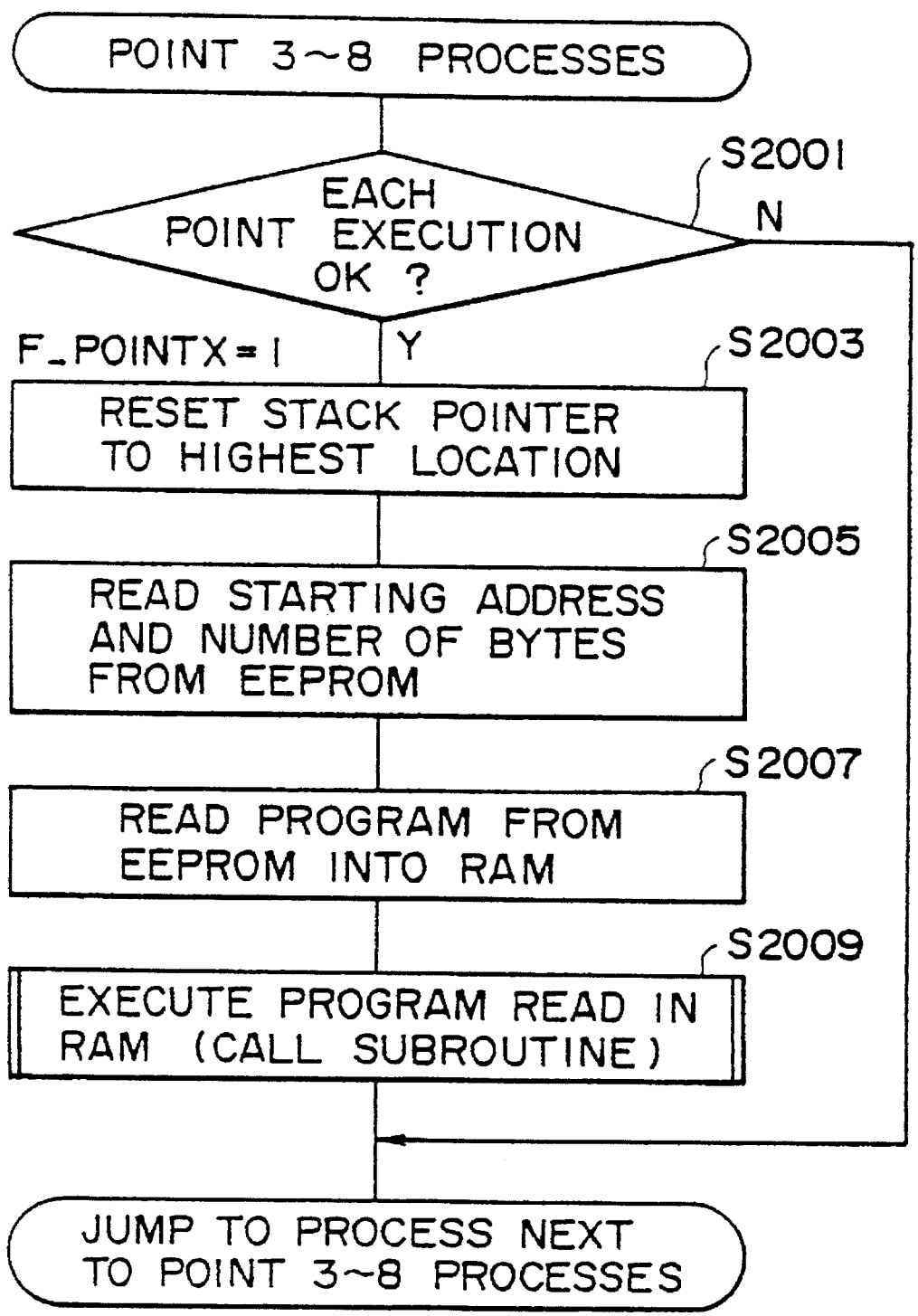
FIG. 20 is a flowchart of POINT 3 through "POINT 8 processes as subroutines executed in the restart process shown in FIG. 14 and the shutter release process shown in FIG. 15.
Figure 26:
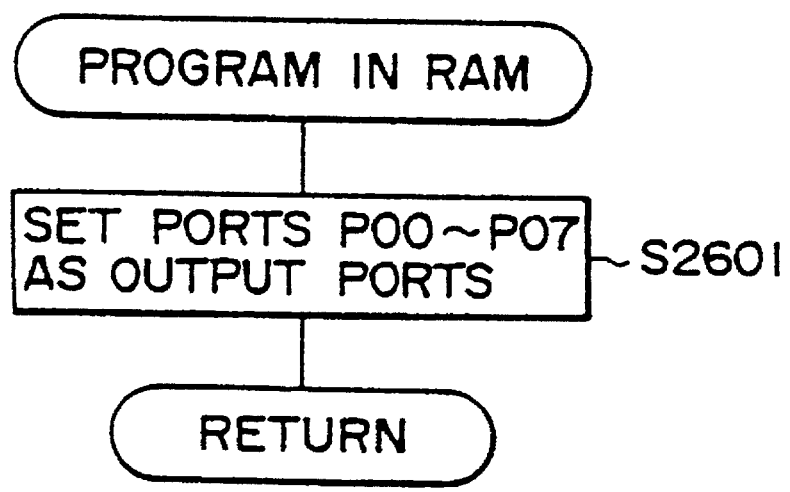
FIG. 26 is a flowchart of a control sequence of a modification of the POINT 2 process.

More specifically, according to the modification, the control sequence shown in FIG. 20 is executed in the POINT 2 process, and a subroutine called in this control sequence is shown in FIG. 26. When the subroutine shown in FIG. 26 is called, all the ports P00–P07 are set to function as output ports in step S2601, and then control returns to the restart process.

In this modification, therefore, a bug can be removed based on program information which is read, using the control sequence shown in FIG. 26.

The present disclosure relates to subject matters contained in Japanese Patent Application No. HEI 5-166208, filed on Jun. 11, 1993, and Japanese Patent Application No. HEI 5-166209, filed on Jun. 11, 1993, which are expressly incorporated herein by reference in their entireties.

What is claimed is:

1. A method of controlling an operation of an electronically controlled camera, a system of the camera including a first memory for storing a program to control the camera, a second memory for storing parameter data representing an operational status of the camera, and a rewritable memory for storing at least one auxiliary process, flag data used for determining whether the at least one auxiliary process is to be executed and operational data including information related to a bit manipulation of the parameter data stored in the second memory, the method comprising the steps of:

reading the flag data;

determining whether the at least one auxiliary process is to be executed based on the flag data; and executing the at least one auxiliary process when it is determined, in said determining step, that the at least one auxiliary process is to be executed, wherein the at least one auxiliary process comprises the steps of:

reading the operational data stored in the rewritable memory; and performing bit manipulation of the parameter data in accordance with the operational data.

2. The method according to claim 1, wherein the information comprises address information which designates the parameter data stored in the second memory.

3. The method according to claim 2, wherein the information includes numerical information, said method further comprising performing a logic operation to process the numerical information and the parameter data designated by the address information.

4. The method according to claim 3, wherein said logic operation comprises one of an OR operation, an AND operation and an Exclusive-OR operation.

5. The method according to claim 3, wherein the logic operation comprises a step for performing an operation to cancel a bug of the program.

6. The method according to claim 1, wherein the operational data comprises an address data which designates a supplemental program stored in the rewritable memory, and wherein a predetermined operation is performed by executing the supplemental program.

7. The method according to claim 1, further comprising the step of connecting the rewritable memory with an external device which is capable of rewriting at least one of the flag data and the operational data.

8. The method according to claim 1, further comprising the step of placing a plurality of auxiliary processes at different predetermined positions of the program.

9. The method according to claim 1, wherein the rewritable memory comprises an EEPROM.

10. The method according to claim 1, wherein the memory comprises a read only memory.

11. The method according to claim 1, wherein the second memory comprises a random access memory.

12. The method of controlling an operation of an electronically controlled camera according to claim 1, further comprising the step of copying the at least one auxiliary process from the rewritable memory to the second memory before executing the at least one auxiliary process.

13. A method of controlling an operation of an electronically controlled camera, a system of the camera including a first memory for storing a program to control the camera, and a rewritable memory for storing at least one auxiliary process, flag data used for determining whether the at least one auxiliary program is to be executed, at least one supplemental program for executing a predetermined operation and operational data including address data designating the at least one supplemental program in the rewritable memory, the method comprising the steps of:

reading the flag data;

determining whether the at least one auxiliary process is to be executed based on the flag data; and executing the at least one auxiliary process when it is determined, in said determining step, that the at least one auxiliary process is to be executed, wherein the at least one auxiliary process comprises the steps of:

reading the address data; and operating upon a supplemental program which is designated by the address data.

14. The method according to claim 13, the step of operating upon a supplemental program comprising loading the supplemental program and executing the loaded supplemental program.

15. The method according to claim 13, the step of operating upon a supplemental program comprising executing the supplemental program.

16. The method according to claim 15, wherein the supplemental program comprises the step of canceling a bug of the program.

17. The method according to claim 15, wherein the supplemental program comprises the step of adding a function to the program.

18. The method of controlling an operation of an electronically controlled camera according to claim 13, further comprising the step of copying the at least one auxiliary process from the rewritable memory to a second memory before executing the at least one auxiliary process, the second memory storing parameter data representing an operational status of the camera.

19. A method of controlling an operation of an electronically controlled camera, the camera comprising a memory for storing a program to control the camera, and a rewritable memory for storing at least one auxiliary process, flag data used for determining whether the auxiliary process is to be executed and operational data for executing the at least one auxiliary process, the method comprising the steps of:

reading the flag data;

determining whether the at least one auxiliary process is to be executed based on the flag data; and executing the at least one auxiliary process based upon the operational data when it is determined that the at least one auxiliary process is to be executed, wherein the operational data stored in the rewritable memory comprises address data which designates a supplemental program stored in the rewritable memory and a predetermined operation is performed by executing the supplemental program.

20. The method according to claim 19, wherein the supplemental program comprises the step of cancelling a bug of the program.

21. The method according to claim 19, wherein the supplemental program comprises the step of adding a function to the program.

* * * * *

UNITED STATES PATENT AND TRADEMARK OFFICE
CERTIFICATE OF CORRECTION

PATENT NO. : 5,561,493
DATED : October 1, 1996
INVENTOR(S) : H. TAKAHASHI

It is certified that error appears in the above-indentified patent and that said Letters Patent is hereby corrected as shown below:

At column 21, lines 30-34 (claim 6, lines 1-5), delete "The method according to claim 1, wherein the operational data comprises an address data which designates a supplemental program stored in the rewritable memory, and wherein a predetermined operation is performed by executing the supplemental program."

At column 22, line 22 (claim 16, line 1), change "15," to ---13, ---.

At column 22, line 25 (claim 17, line 1), change "15," to ---13, ---.

Signed and Sealed this

Twenty-ninth Day of April, 1997

BRUCE LEHMAN

Attest:

Attesting Officer

Commissioner of Patents and Trademarks